(12) United States Patent
Unsworth et al.

(10) Patent No.: US 8,305,024 B2
(45) Date of Patent: Nov. 6, 2012

(54) MOTOR STARTING AND SWITCHING

(76) Inventors: Peter Unsworth, Lewes (GB); James Joseph Kinsella, Jupiter, FL (US)

( * ) Notice: Subject to any disclaimer, the term of this patent is extended or adjusted under 35 U.S.C. 154(b) by 88 days.

(21) Appl. No.: 12/869,912

(22) Filed: Aug. 27, 2010

(65) Prior Publication Data

US 2011/0210615 A1  Sep. 1, 2011

Related U.S. Application Data

(62) Division of application No. 11/575,890, filed on Jul. 18, 2007, now Pat. No. 7,812,563.

(30) Foreign Application Priority Data

Sep. 27, 2004 (GB) ................................ GB0421443.3
Sep. 12, 2005 (WO) ................. PCT/GB2005/003503

(51) Int. Cl.
  *H02H 7/08* (2006.01)
(52) U.S. Cl. .......................................... 318/519; 307/87
(58) Field of Classification Search .................. 318/459, 318/478, 479, 484, 519, 520; 307/64, 65, 307/85–87; 361/88, 93.1, 160
See application file for complete search history.

(56) References Cited

U.S. PATENT DOCUMENTS

| 1,796,220 | A |  | 3/1931 | Seeley |
| 3,646,415 | A |  | 2/1972 | Robb |
| 3,767,987 | A |  | 10/1973 | Mitsui et al. |
| 4,470,001 | A |  | 9/1984 | Resch et al. |
| 4,628,241 | A |  | 12/1986 | Bristow et al. |
| 4,800,326 | A |  | 1/1989 | Unsworth |
| 4,845,594 | A | * | 7/1989 | Wilkerson ........................ 361/71 |
| 4,950,970 | A |  | 8/1990 | Davis et al. |
| 5,140,247 | A |  | 8/1992 | Verbos |
| 5,481,171 | A |  | 1/1996 | Woginrich et al. |
| 5,703,448 | A | * | 12/1997 | Yang ............................. 318/245 |
| 5,811,946 | A | * | 9/1998 | Mullin et al. ................... 388/811 |
| 5,859,513 | A |  | 1/1999 | Stephens et al. |

(Continued)

FOREIGN PATENT DOCUMENTS

GB  429200  5/1935
JP  62207195  9/1987

OTHER PUBLICATIONS

Brunke, et al., "Elimination of Transformer Inrush Currents by Controlled Switching", Part I—Theoretical Considerations, pp. 1-6.

(Continued)

*Primary Examiner* — Bentsu Ro
(74) *Attorney, Agent, or Firm* — Baker Botts L.L.P.

(57) ABSTRACT

A method of starting and apparatus for starting a multiphase electrical machine is disclosed. The aim is to reduce oscillatory pulsation in torque generated by the motor and inrush current that occurs shortly after start-up. The starting method comprises the steps of first connecting at least one, but less than all, of a plurality of windings to a respective phase-shifted supply voltage at a controlled point in the supply phase. Then, after a controlled delay following the first connection, connecting the or each remaining winding of the machine a respective phase-shifted supply voltage. The invention has particular application to multiphase (most usually, 3-phase) motors. However, it can also be applied to other electrical machines, such as generators and transformers. The method can be performed at initial start-up or, in the case of application to a motor, at Y-delta switchover.

2 Claims, 20 Drawing Sheets

U.S. PATENT DOCUMENTS

| | | |
|---|---|---|
| 6,956,728 B2 | 10/2005 | Zhou et al. |
| 7,038,423 B2* | 5/2006 | Reed et al. .................... 318/729 |
| 2005/0013085 A1 | 1/2005 | Kinsella et al. |

OTHER PUBLICATIONS

Brunke, et al., "Elimination of Transformer Inrush Currents by Controlled Switching", Part II—Application and Performance Considerations, pp. 1-6.

Cadirci, et al. "A Solid State Direct on Line Starter for Medium Voltage Induction Motors With Minimized Current and Torque Pulsations", IEEE Transactions on Energy Conversion, vol. 14, No. 3, Sep. 1999.

Bendl, et al., "Torque and Current Stress of a Three-Phase Induction Motor Due to Non-Simultaneous Switch-On", Electric Machines and Power Systems, Copyright © 1993, pp. 591-603.

Vas, Peter, "Electrical and Machines and Drivers", A Space Vector Theory Approach, pp. 436-441.

Bendl, et al., "Torque and Current Stress by Non-Simultaneous Switching-On of Phases of a Three-Phase Induction Motor", Acta Technica CSAV, 1991, pp. 358-373.

PCT International Search Report PCT/GB2005/003503; dated Mar. 10, 2006.

* cited by examiner

| ROUTINES | SUBROUTINES | INTERRUPT |
|---|---|---|
| RESET | SUBROUTINE Check START/STOP buttons | PLL Interrupt |
| CHECK FOR START | | |
| START MOTOR IN WYE | | |
| MOTOR RUNNING IN WYE | SUBROUTINE Check for transition to Delta | |
| TRANSITION TO DELTA | SUBROUTINE Synchronize to back emf | |
| MOTOR RUNNING IN DELTA | | |
| OPEN CONTACTOR AND STOP MOTOR | | |

MOTOR STARTING AND SWITCHING

CROSS REFERENCE TO RELATED APPLICATION

This application is a divisional application of U.S. application Ser. No. 11/575,890 filed on Jul. 18, 2007, which claimed the benefit of PCT/GB05/003503 filed Sep. 12, 2005, which claimed the benefit of GB0421443.3 filed Sep. 27, 2004.

TECHNICAL FIELD OF THE INVENTION

This invention relates to a control system for motor starting and switching, to motors, and to methods for starting and switching motors.

BACKGROUND OF THE INVENTION

When an electromagnetic contactor is used to start up an induction motor from rest, during acceleration the motor draws a starting current from the supply that is between six and ten times motor full load current (FLC), depending on the size and construction of the motor. As the motor approaches full speed, the current falls to the full load value, or less if the load on the motor is less than full load.

However, a number of additional undesirable phenomena occur which are caused by the sudden connection of the supply to the motor. Most obviously, during the first fraction of a second or so following switch-on (increasing to many seconds for large motors), there is a severe oscillatory pulsation in torque generated by the motor. This can be heard and felt as a strong vibration which imposes high mechanical stress on the whole of a drive train to which the motor is connected, especially on shaft couplings, gearboxes, bearings, and on stator windings though the reaction force that they experience. The peaks in the pulsating torque can be both positive and negative, and many times the maximum torque experienced under normal running. This variation in torque can be a significant factor in causing breakdown, especially in motors subject to frequent starting.

Less obvious, but just as serious, is the fact that during the transient period of torque pulsation, supply current peaks can be up to twice the expected steady-state locked rotor starting current. This abnormally high current is known as surge current, and can cause problems for motor protection. Generally, motor starters combine a contactor with overload protection to disconnect the motor if it draws excessive current. The overload mechanism must allow for the high starting current without disconnecting the motor prematurely, but nevertheless be able to shut down the motor during running if it becomes overloaded and draws more than only 110% of full load current. With high-efficiency motors, surge current can reach eighteen times FLC, which complicates setting of overload relays and breakers to allow starting yet still provide adequate running protection.

SUMMARY OF THE INVENTION

An aim of this invention is to overcome, or at least ameliorate, the problems that occur during starting of a 3-phase electric motor.

The present inventors have discovered that it is, however, possible to reduce or eliminate both the torque pulsation and the doubling of inrush current by modifying the way in which starter contactors are switched on. Traditionally, in a 3-phase system, the contacts for each of the three phases are closed at the same time. This simultaneous closure generates a transient current surge in addition to the expected locked rotor current, and an associated transient pulsation in torque. If, on the other hand, in a 3-wire system connected by connecting devices such as contactor poles placed between the supply and the motor terminals, two contacts are closed first when the line voltage between the two phases is at its peak value, and then the third contact is closed a quarter of a cycle later, both the torque pulsation and surge current are reduced or eliminated.

To this end, from a first aspect, this invention provides a method of starting a multiphase electrical machine comprising the steps of: i. connecting at least one, but less than all, of a plurality of windings to a respective phase-shifted supply voltage at a controlled point in the supply phase; and ii. after a controlled delay following the connection made in step i., connecting the or each remaining winding of the machine a respective phase-shifted supply voltage.

In due course, an explanation will be presented as to why this simple modification in the contactor switching sequence is effective. It will be referred to as point on wave (POW) switching. Methods of control to achieve this are described, and its application to direct-on-line (DOL) starting of both Y-connected and Delta-connected motors. POW switching may also be applied to minimise the unpleasant and serious transients that accompany the transition from wye (Y) to delta connection in Y-delta starters, and can also reduce the huge surge currents that occur when transformers are energized, and in connecting standby and wind generators to either transformers or to the mains supply.

Typically, in step i., connection is made at a controlled point selected to occur when an induced back electro-motive force (e.m.f.) in the machine is substantially in phase with the supply voltage. The method may further comprise monitoring the phase of the back-e.m.f. in order to determine when the back-e.m.f. is in phase with the supply voltage. The controlled delay may correspond to a phase delay of either 90° or 120°, depending on the configuration of the connection from the supply to the load.

In typical embodiments, at least one of the windings is connected by means of electrically controlled single contactor poles. Advantageously, at least one contactor pole is connected by means of a switched DC voltage source to achieve repeatable and accurate timing of contact closure. In this context, controlling the connector pole using DC allows its closure to be timed more accurately than would be the case with an AC-controlled connector pole.

A method embodying this aspect of the invention is typically applied to an electrical machine that comprises a three-phase motor. In such cases, the method may be executed upon switching from a Y configuration of motor windings to a delta configuration of motor windings. For example, switching from Y configuration of motor windings to delta configuration of motor windings may take place at 75% or greater of the full operational rotational speed of the motor. Alternatively, switching from Y configuration of motor windings to delta configuration of motor windings may take place when the starting current in the Y configuration has fallen below a pre-determined threshold, or after a pre-determined starting time.

A method of embodying this aspect of the invention may also be applied to an electrical machine that comprises any one or more of the following: a wind generator, a transformer, or a standby generator. In such cases, the standby generator may be connected to a transformer or to an electrical machine.

From a second aspect, the invention provides a method of preventing current, or torque, transients in a multiphase electrical machine following loss of an a.c. supply voltage comprising the steps of: i. disconnecting windings of the machine from the supply; ii. monitoring a back-e.m.f. at a terminal of the machine; iii. determining a phase difference between the back-e.m.f. and a model phase of the a.c. supply voltage; iv. connecting at least one winding between a source of the a.c. supply voltage and the electrical machine when the recovered supply and the back-e.m.f. are substantially in phase; and v. closing the remaining contactor poles after a controlled delay. Such a method may typically be applied in cases in which the electrical machine is a three-phase motor.

From a third aspect, the invention provides a multiphase a.c. electrical machine comprising a plurality of contactor poles and a control device, each of the contactor poles being arranged to be connected to a respective a.c. supply voltage each of the respective a.c. voltages being phase shifted relative to each other, the control device being arranged to control the connection of the contactor poles to their respective a.c. supply voltages, wherein the control device is arranged to connect some, but not all, of the plurality of connector poles to their respective a.c. supply voltages at a first point in time and to connect the remaining connector pole, or poles, to their respective a.c. supply voltages after a controlled time delay.

The control device may comprises monitoring means arranged to monitor the relative phases of or frequencies of a back electro-motive force and the a.c. supply voltages. Typically, the control device is arranged to connect the remaining contactor pole, or poles, to their respective a.c. supply voltages after a controlled time delay corresponding to a phase delay of either 90° or 120°. Alternatively or additionally, the machine may comprise electrically operated switching means arranged to switch at least one of the windings into and out of connection with the a.c. supply voltage. Advantageously, the switching means may be operated by a D.C. voltage source.

In typical embodiments of the invention, the electrical machine is a three-phase motor. In such embodiments, the control device may be arranged to control the switching of the motor from a Y configuration of motor windings to a delta configuration of motor windings. In the delta configuration of motor windings, contactor poles may be located internal of the delta configuration of motor windings or they may alternatively be located externally of the delta configuration of motor windings.

A control device embodying the invention may be arranged, during reconnection in the delta configuration, to monitor a back-e.m.f. in one winding of the delta configuration of motor windings, the winding being connected to at least one of the remaining pole contactors, the control device being further arranged to connect the respective a.c. supply voltage to the winding when the back-e.m.f. is in phase with the a.c. supply voltage to be connected across that winding.

In alternative embodiments, motor windings of the motor may be arranged to be connected to the a.c. supply voltages in Y configuration during an initial period of operation of the machine, and the motor windings are arranged to be re-connected to the a.c. supply voltages in delta configuration during a second period of operation of the machine. In such embodiments, the control device may be arranged to switch from the Y configuration of motor windings to the delta configuration of motor windings when the rotational speed of the motor has reached at least 75% of full operational speed or when the starting current in the Y configuration has fallen below a pre-determined threshold or after a pre-determined starting time as the motor approaches full speed.

In alternative embodiments of this aspect of the invention, the electrical machine may comprise any one, or combination, of the following: a wind generator, a transformer, a standby generator, and a three-phase motor. From a fourth aspect, the invention provides control device, suitable for use in a multi-phase a.c. electrical machine, the device being arranged to control the opening and closing of a plurality of contact means, the contact means being arranged to selectively place a winding of a machine in electrical connection with multiphase a.c. supply voltages, wherein the device is arranged to close at least a first contact means prior to closing at least a second contact means after a controlled delay.

Typical embodiments, include a processor that is arranged to receive signals indicative of the relative phase difference between at least one respective supply voltage associated with at least the first contact means and a back-e.m.f. from sensors associated with the electrical machine winding which will be connected to the said supply voltage. The processor may be arranged to output a signal to close at least the first contact means when the at least one supply voltage is in phase with the back-e.m.f. of the machine winding to which it will be connected.

The control device may be arranged to open one or more of the contact means in response to a phase difference between the back-e.m.f. and the expected phase of a supply voltage indicating a loss of said supply voltage.

From a fifth aspect, the invention provides software which when executed upon a processor causes the processor to: i. receive a first signal indicative of the phase of an a.c. supply voltage arranged to be supplied to a multiphase electrical machine; ii. receive a second signal indicative of the phase of a back-e.m.f. in a component of a multiphase a.c. electrical machine; iii. determine a phase difference between the back-e.m.f. and the supply voltage based upon the first and second signals; and either of: a. wait until the back-e.m.f comes into synchronization with the supply to initiate a two step connection process at predetermined phase angles in the supply to selectively place the electrical machine in contact with the supply voltage, if the back-e.m.f. is significant; or b. output signals to actuate contact means in a controlled two-step process at predetermined phase angles in the supply to selectively place the electrical machine in contact with the supply voltage if the back-e.m.f. is small.

Software embodying the invention is typically arranged to actuate the contact means to connect the element of the electrical machine to the supply voltage if the phase difference between the back-e.m.f. and the supply voltage to be connected across the element is substantially zero. Alternatively or additionally, the software may be arranged to actuate the contact means to remove the electrical machine from connection with the supply voltage if the phase difference between the back-e.m.f. and the supply voltage phase expected on the basis of its known frequency.

From a sixth aspect, the invention provides a method of controlling a.c. voltage application to a multiphase a.c. electrical machine comprising: i. receiving a first signal indicative of the phase of an a.c. supply voltage arranged to be supplied to the electrical machine; ii. receiving a second signal indicative of the phase of a back-e.m.f. in a component of a multiphase a.c. electrical machine; iii. determining a phase difference between the back-e.m.f. and the supply voltage based upon the first and second signals; based on the determination either: a. wait until the back-e.m.f. comes into synchronization with the supply to initiate a two-step connection process at predetermined phase angles in the supply to selectively place the electrical machine in contact with the supply voltage if the back-e.m.f. is significant; or b. output signals to actuate contact means in a controlled two step process at precise phase angles in the supply to selectively place the electrical machine in contact with the supply voltage if the back-e.m.f. is small.

The method may actuate the contact means in response to a control signal to remove the electrical machine from connection with the supply voltage if the phase difference between the back-e.m.f. and the expected supply voltage phase based on its known frequency is indicative of a loss of the supply voltage.

In a method embodying the first aspect of the invention where the electrical machine is a wind generator, the controlled time delay corresponds to a delay after which a phase of the generator e.m.f. becomes substantially synchronized with that of the supply voltage.

This invention also provides a method effective to reverse a motor, whereby after the disconnection of the supply to a motor already rotating in a first direction and interchanging two phase connections so as to be able to drive the motor in the reverse direction, the reconnection of the supply to the motor is done by a method according to the first aspect of the invention.

Specifically, some or all of the following benefits will be achieved by embodiments of the invention:

A significant reduction, typically by a factor of two, in surge currents in electric motors.

A consequential 50% reduction in harmful peak torques in mechanical loads and electrical windings.

A reduction of system-wide surge overcurrents allows circuit breakers to be set at levels to ensure system robustness and thereby improve plant-wide up-time and overall safety. Present industry practice is to set trip currents 50% higher than desired in order to avoid nuisance tripping of circuit breakers by surge overcurrents.

Elimination of power resistors and transition contactors in Y-Delta starters.

Reduction in inrush surge currents by up to a factor of ten when applying power to large transformers.

A decrease in surge loading, electrical and mechanical, on standby and wind generators.

A size and cost reduction of up to 50% in electrical controllers.

A significant decrease in plant-wide electrical and mechanical maintenance with consequent reductions in down time and improvement in safety.

An inherently capability to provide real-time monitoring of plant switching operations for wellness purposes.

Mitigation of harmful short circuit currents, especially for enclosed/defined applications such as chillers and for physically dispersed loads as found with motor control centres.

BRIEF DESCRIPTION OF THE DRAWINGS

Embodiments of the invention will now be described in detail, by way of example, and with reference to the accompanying drawings, in which:

FIG. 6 shows phase voltage waveforms showing three alternative connection sequences for 2-stage switch-on;

DETAILED DESCRIPTION OF THE INVENTION

As an introduction to the thinking behind the invention, there will now be presented a brief description of how simultaneous switching of three phases during starting of a motor generates transient surge currents. When an induction motor is at rest, the internally generated back-e.m.f. is zero. If the stator resistance $R_s$ is ignored, then when the supply is applied, current flow is determined by the stator inductance. If all three phases are energised together, the current flow is made up of the balanced steady-state 3-phase AC starting current that will flow plus an exponentially decaying DC transient current, present in differing amounts in each phase.

The amplitude of the DC transient is determined at the moment of connection when all currents are zero, and their rate of change is limited by the motor inductance. It follows that at the moment immediately after connection the currents must still be zero, before they have had time to grow. Hence, immediately after connection:

Steady state current+DC transient current=0 so that the amplitude of the DC transient current equals (minus) the steady state starting current value at time zero. This DC current decays with the motor magnetization time constant, and takes typically 0.2-5 s to decay away, increasing with motor size.

The effect of the DC current is to cause the severe torque pulsation that accompanies motor starting. This happens because instead of the uniformly rotating magnetic field that the steady state AC currents would produce, the DC transient introduces an additional non-rotating, decaying DC field component. This adds to the AC field when they are aligned, but half a cycle later subtracts from the AC field, as they are then opposed. Instead of keeping a steady (rotating) value, the motor flux therefore oscillates between (AC flux+DC flux) and (AC flux−DC flux). This causes a severe oscillation in motor torque at supply frequency that only subsides as the DC flux decays away. It may last several seconds in large motors.

Figure 1:
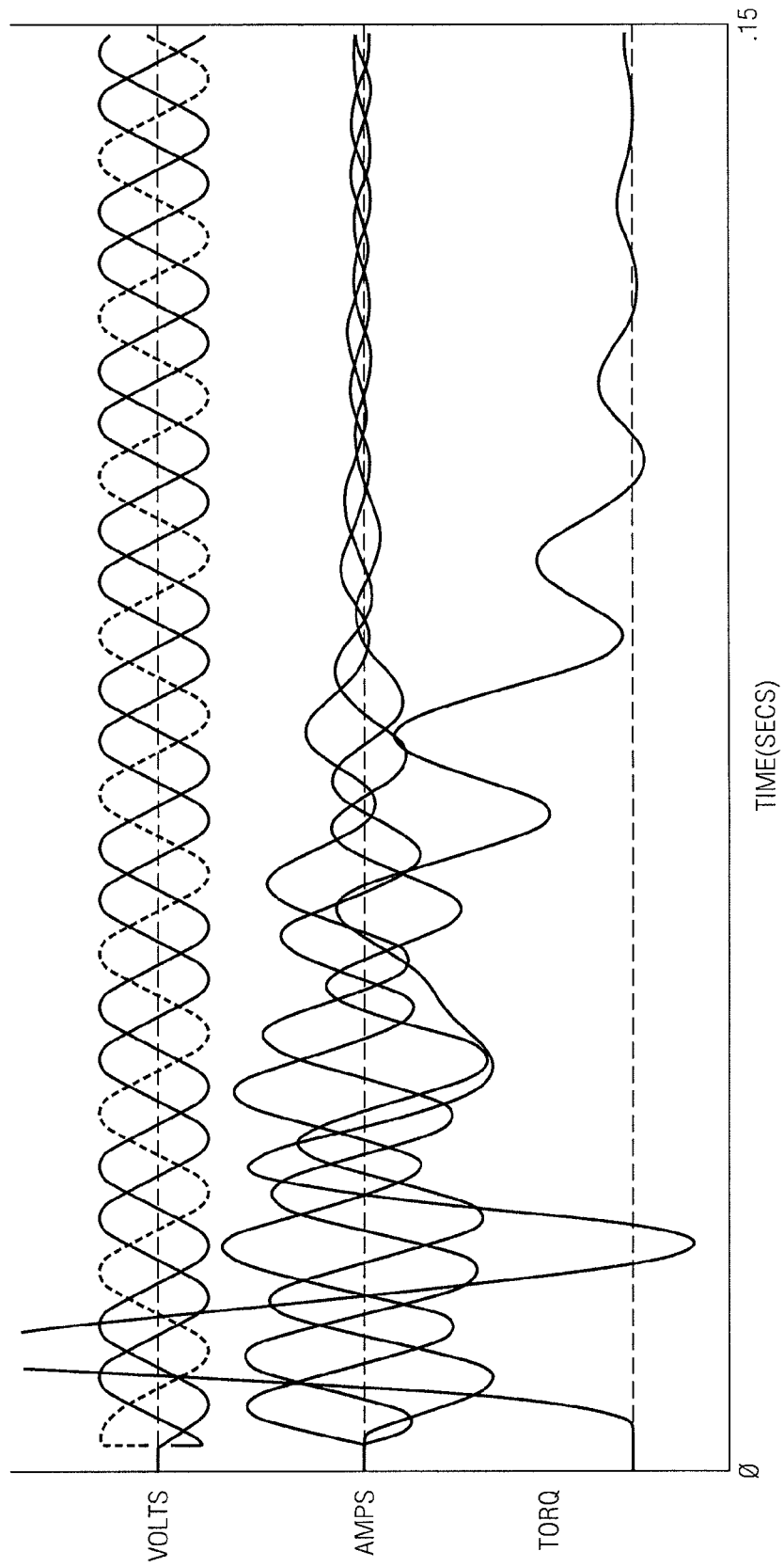
FIG. 1 is a trace showing transient current and voltage during a full DOL start for an unloaded delta motor with simultaneous closure of contactor poles.

FIG. 1 illustrates the currents and voltages that appear after a full DOL start for an unloaded delta-connected motor with simultaneous closure of contactor poles. The bottom trace shows the severe torque pulsation, and the middle curves show the very unbalanced 3-phase line current. The top traces show the supply voltages from the moment of connection.

Having described the effect of conventional methods of starting a motor, the manner in which the present invention reduces or eliminates transients can now be described.

Switching methods embodying the invention will be referred to as "point on wave" switching, and this will be abbreviated to "POW".

In embodiments of the invention, 2-stage POW switching is able to reduce or eliminate the excitation of the slow decaying DC transient current and associated torque pulsation. For a Y-connected motor, just two phases of the motor are first connected to the supply terminals to build up current in two of the motor windings. Then, at the moment when the third phase is connected (with zero current in that winding) all three currents are exactly equal to their steady state AC values corresponding to that point on the supply waveforms. If the currents are at the steady state value immediately before and after connection of the third phase, no additional DC transient current is needed, and the motor starts with a balanced set of AC currents equal to the steady state locked rotor current, and the torque pulsation is absent.

In starting a motor from rest, the point in the supply waveform when the first two phases are connected must be chosen correctly, so that current in those phases builds up to reach exactly the steady state value required at the moment when the third supply phase is connected. This is achieved if the first two phases are connected at the moment when the line voltage between the two phases is at its peak, and the third phase is connected exactly 90 degrees later (a quarter of a supply cycle).

Examples of simultaneous switching and POW switching will now be described.

Figure 2:
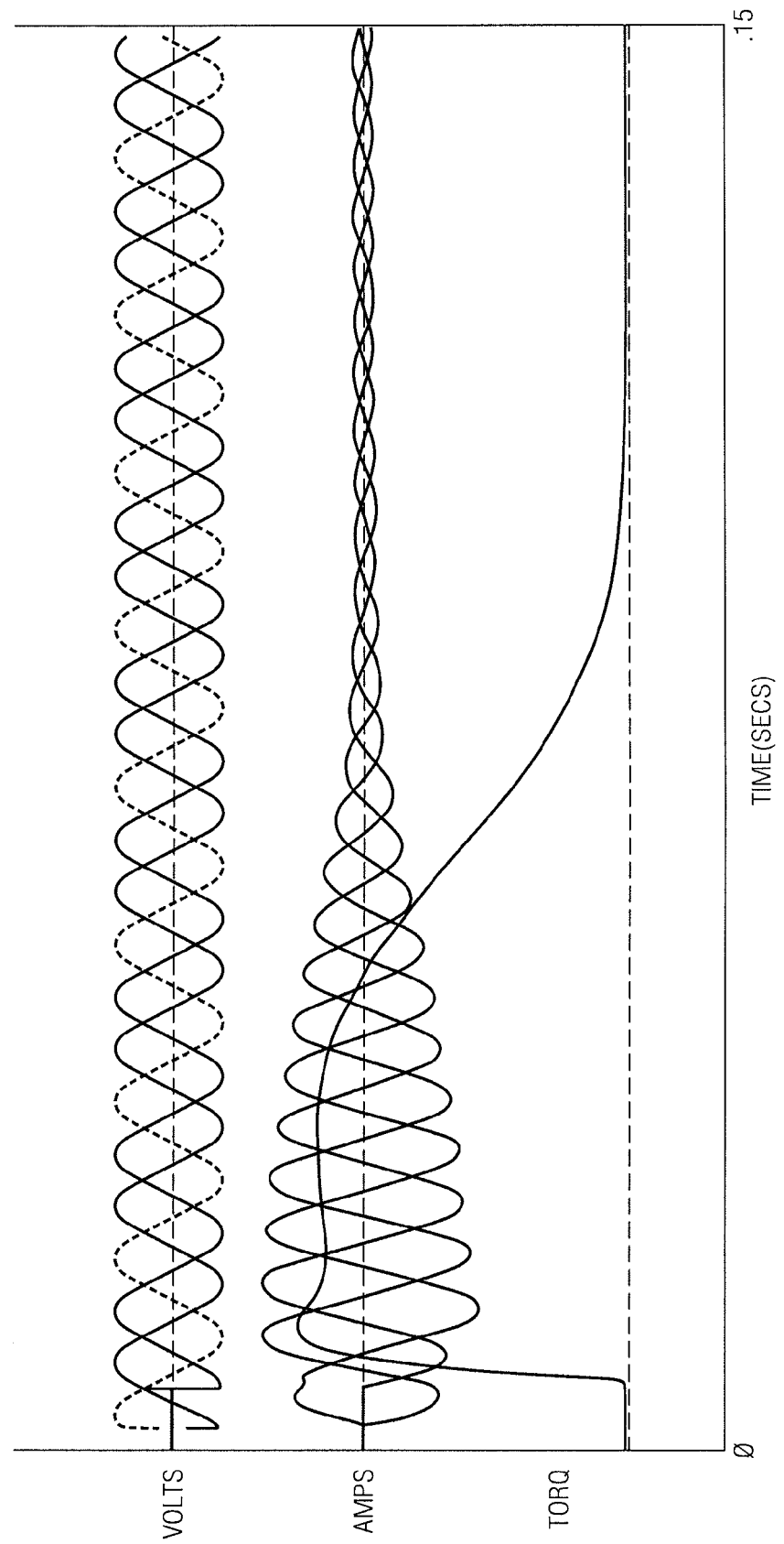
FIG. 2 is a trace showing transient current and voltage during starting of the motor of FIG. 1 being started by a method embodying the invention.

FIG. 2 shows the effect of application of a POW method to the same motor that generated the trace of FIG. 1. As can be seen from FIG. 2, torque pulsation is virtually eliminated, and the motor supply currents are balanced with significantly lower peak currents. The top voltage plots show the 2-stage connection sequence.

A theoretical review of POW switching will now be presented. Specifically, this section sets out the theory for the 2-stage connection procedure, and how it may be applied to both Y-configured and delta-configured motors.

Figure 3:
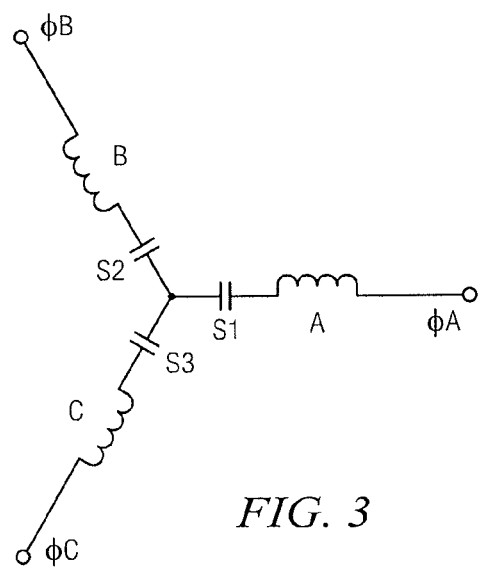
FIG. 3 illustrates connections for a motor in Y-configuration.

DC transients due to simultaneous switching of three supply phases occur in Y-configuration. FIG. 3 shows connections for motor in Y-configuration. The contactor poles S1, S2, S3 may be placed at either end of the windings.

The 3-phase supply voltage ABC may be described by a space vector $\overline{u}_s(t)$ given by $$\overline{u}_s(t) = u_s e^{j(\omega t + \alpha)} \qquad (1)$$

where $u_s$ is the supply phase voltage amplitude, and the space vector $\overline{u}_s(t)$ rotates at the angular frequency to ω of the supply. α is the supply phase angle at the time t=0 when power is applied.

The build-up of flux Ψ in the motor is given according to Faraday's Law by $$\frac{d\overline{\psi}}{dt} = \overline{u}_s(t) = u_s e^{j\omega t} e_a \qquad (2)$$

By integration, $$\overline{\psi}(t) = u_s \frac{e^{j\omega t}}{j\omega} e^{j\alpha} + \overline{\Psi}_{DC} \qquad (3)$$

$$= \overline{\psi}(t)_{Steady\ state} + \overline{\psi}_{DC\ transient}$$

$\overline{\psi}_{DC\ transient}$ is the constant of integration required to satisfy initial conditions. When $\overline{u}_s(t)$ is applied to the motor at t=0 at phase angle α with no flux in the motor (i.e. ψ=0)

$$\overline{\psi}(0) = 0 = u_s \frac{e^{j\alpha}}{j\omega} + \overline{\psi}_{DC} \qquad (4)$$

Hence, the DC transient flux is given by $$\overline{\psi}_{DC} = u_s \frac{e^{j\alpha}}{j\omega} + j\frac{\overline{u}_s(0)}{j\omega} \qquad (5)$$

so that the general solution for the flux is $$\overline{\psi}(t) = -j\frac{\overline{u}_s(t)}{\omega} + j\frac{\overline{u}_s(0)}{\omega} \qquad (6)$$

$$= \overline{\psi}(t)_{Steady\ state} + \overline{\psi}_{DC\ transient}$$

Figure 4:
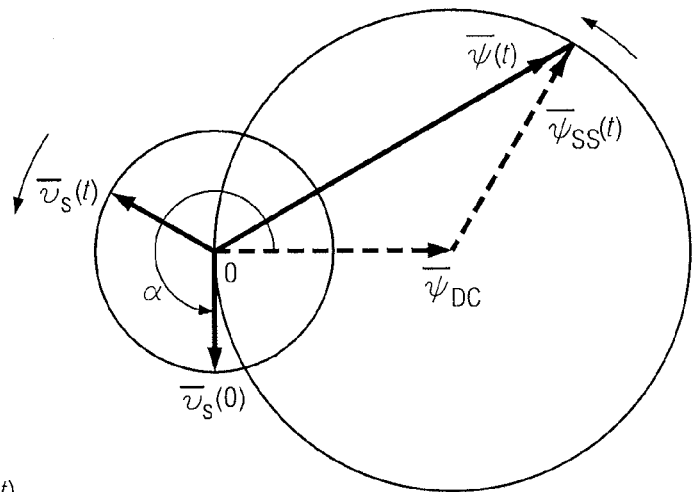
FIG. 4 is a space vector diagram that illustrates the effect of simultaneous connection of three phases of a motor.

In the case of simultaneous switch-on of three phases, as illustrated in FIG. 4, the factor −j multiplying the voltage space vector $\overline{u}_s(t)$ in equation (6) means that the steady-state flux $\overline{\psi}_{ss}(t)$ rotates with $\overline{u}_s(t)$, but lags behind in rotation by 90 degrees. The DC transient flux $\overline{\psi}_{DC}$ is on the other hand fixed in orientation 90° ahead of the direction of the initial supply vector $\overline{u}_s(t)$ at the moment of switch-on, and only gradually decays away. The space vector diagram FIG. 4 expresses the relations in equations (3), (5), and (6). The steady-state flux $\overline{\psi}_{ss}(t)$ has constant amplitude and rotates about the fixed centre determined by the transient $\overline{\psi}_{DC}$, which only decays away slowly. Hence, as $\overline{\psi}_{ss}(t)$ rotates, the presence of the DC flux $\overline{\psi}_{DC}$ causes the amplitude of the resultant flux $\overline{\psi}(t)$ to oscillate strongly. The effect is strong torque pulsations and unbalanced currents until the DC transient decays away.

The above will now be contrasted with a 2-stage POW switching to eliminate the DC transient.

The DC transient may be eliminated, or substantially reduced, if the switch-on process is performed in two stages. The 2-stage POW switch on process is first described, and then the theory of the process is explained.

Stage 1: The supply voltage is connected to the motor in FIG. 3 at time t=0 to just two windings B & C of a Y-configuration motor by closing contactor poles S2 & S3 at the peak of the $V_{bc}$ line voltage. Current flow through windings B & C builds up flux $\overline{\psi}0$ in the direction shown in FIG. 5. No current flows in winding A.

Figure 5:
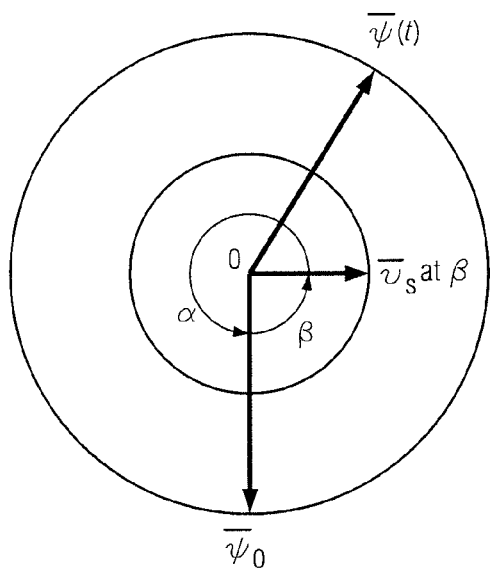
FIG. 5 is a space vector diagram that illustrates the effect of two-stage connection of three phases of a motor in accordance with an embodiment of the invention.

Stage 2: After 90°, when the supply space vector described by space vector $\overline{u}_s$ is at orientation β in FIG. 5, the third contactor pole S3 is closed. FIG. 5 shows the situation at this moment. All three phases are connected, and the voltage space vector and initial flux built up in Stage 1 correspond to the correct steady-state values without requiring any additional DC flux transient $\overline{\psi}_{DC}$. ψ=0 is the initial value of the steady state flux $$\overline{\psi}(t) = -j\frac{\overline{u}_s(t)}{\omega}$$

lagging 90° behind the instantaneous position at orientation β of the voltage space vector $\overline{u}_s(t)$ at the moment when S3 is closed. Thereafter, the voltage $\overline{u}_s(t)$ and the flux $\overline{\psi}(t)$ rotate in synchronism 90° apart in their steady state without torque pulsations or excessive peak currents.

2-stage motor switching in Y-configuration will now be described in more detail. The dq components of the voltage space vector applied to the motor are taken as $$u_{SD}=2/3(u_{SA}-0.5u_{SB}-0.5u_{SC})$$

$$u_{SQ}=1/\sqrt{3}(u_{SB}-u_{SC}) \quad (7)$$

where $u_{SA}$, $u_{SB}$, $u_{SC}$ are the voltages across the three windings.

Figure 6:
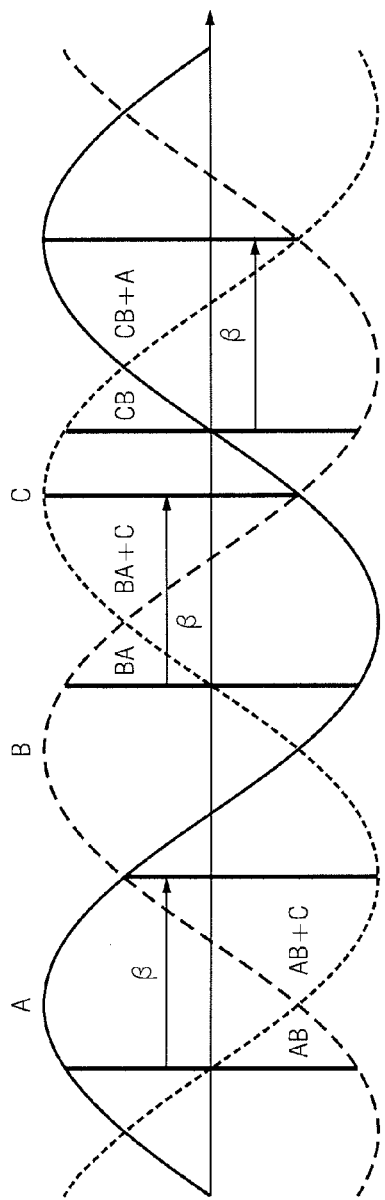

With reference to FIG. 6, phase voltage waveforms showing three alternative connection sequences for 2-stage switch-on are now considered. The vertical lines denote the times when connection is made. AB means phases A & B are connected first, followed by connection of phase C after a 90° delay β at AB+C.

The build-up of flux with phases B & C connected first will now be considered.

The CB line voltage is given by in terms of the amplitude of the supply phase voltage by $$u_{CB}=\sqrt{3}u_S\sin(\omega t+\alpha) \quad (8)$$

Assuming switch on at position CB where line voltage $u_{CB}$ is at its peak, and setting time t=0 at that point, then α=270°. Whilst only the B & C supply voltages are connected, and the A phase winding remains disconnected, the line voltage divides equally across the A and B windings, so that the winding voltages are given by $$u_{SB}=-1/2u_{BC}, u_{SC}=1/2u_{BC}, u_{SA}=0 \quad (9)$$

Using Equation (7) the dq components are $$u_{SD}=0, u_{SQ}=-u_S \quad (10)$$

and $u_{SD}$ remains zero throughout the period β. Hence, during the 90° interval β before phase A is connected, we have $$\frac{d\psi_Q}{dt}=u_{SQ}=-u_s\sin(\omega t+\alpha), \frac{d\psi_D}{dt}=u_{SD}=0 \quad (11)$$

Integrating over the interval β to obtain the flux gives $$\psi_D = -u_s\int_{\omega t=0}^{\omega t=\pi/2}\sin(\omega t+\alpha)dt \quad (12)$$

so that when phase A is connected at $$\psi_D = 0, \psi_Q = -\frac{u_S}{\omega} \quad (13)$$

that is, $$\overline{\psi}(\beta) = -j\frac{u_S}{\omega} \quad (14)$$

This is exactly the instantaneous steady state value $\overline{\psi}_0$ shown in FIG. 5 to enable starting without any decaying DC transient flux and associated torque pulsations and extreme current peaks.

The process of 2-stage POW Delta motor switching (poles outside delta) will now be discussed.

Figure 7:
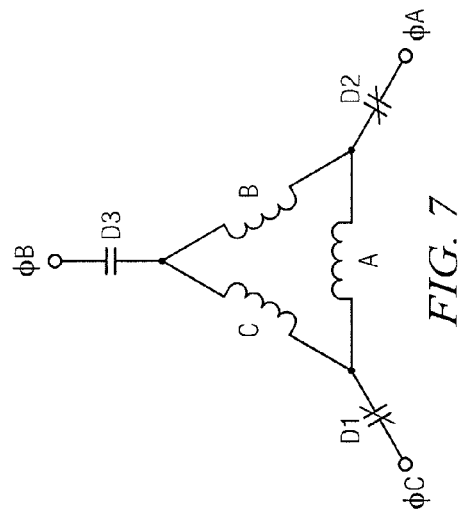
FIG. 7 shows a delta-connected motor with external contactor poles.

When connecting to a delta-configured motor using two-stage switching, if the contactor poles are external to the delta, then switching is done as for Y-connected motors by connecting two phases at their line voltage peak by closing two contacts e.g., D1 and D2 as shown in FIG. 7 to connect phases A & C. The third phase B is then connected 90 degrees later by closing D3.

The flux build up is now calculated. The CA line voltage is $$u_{CA}=\sqrt{3}u_S\sin(\omega t+\pi/2) \quad (15)$$

and when the CA phases are connected at the moment t=0 equals its peak voltage. Since there is no connection to the B phase, the voltage across the three windings is given by $$u_{SA}=\sqrt{3}u_S\sin(\omega t+\pi/2)$$

$$u_{SB}=\sqrt{3/2}u_S\sin(\omega t+\pi/2)$$

$$u_{SC}=u_{SB} \quad (16)$$

Hence, using the dq voltage equations (7)

$$u_{SD}=\sqrt{3}u_S$$

$$u_{SQ}=0 \quad (17)$$

Integrating the flux build up for the 90-degree period until phase B is connected gives $$\psi_{SD} = \int_0^{\omega t=\pi/2} u_{SD}dt \quad (18)$$

$$= \sqrt{3}u_S\int_0^{\omega t=\pi/2}\sin(\omega t+\pi/2)dt$$

$$= \sqrt{3}u_S/\omega$$

This is the instantaneous steady state value $\overline{\psi}_0$ required to enable starting without any decaying DC transient.

Figure 9:
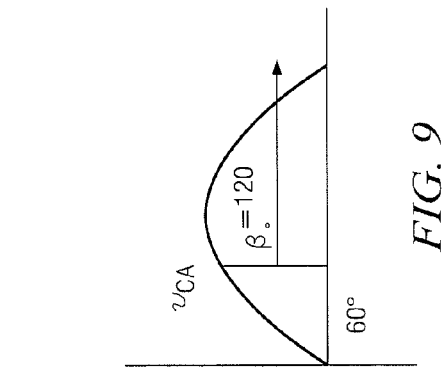
FIG. 9 illustrates the first stage of starting a delta motor with contactor poles within the delta.

The process of 2-stage POW Delta motor switching (poles within the delta) will now be described with reference to FIGS. 8 and 9.

If the contactor poles for delta operation are placed within the delta (as is normal for Y-Delta starting) it is not possible to isolate a supply phase completely from the windings. In this case, the stage 1 connection can be performed by closing only one contact to build up flux using only one winding (contact D1 in FIG. 8 to give current in winding A only).

Because no current flows in the B & C windings, flux must be built up over a longer period $\beta=120°$ starting at $60°$ phase angle of the line voltage $u_{CA}$, rather than for a period $\beta=90°$ starting at the voltage maximum. This modified timing is shown in FIG. 9.

Figure 8:
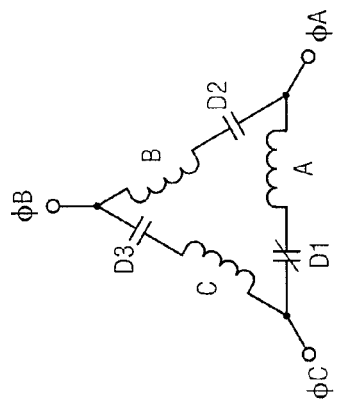
FIG. 8 shows a delta-connected motor with contactor poles placed within the delta.

The winding voltages with the line voltage $u_{CA}$ applied across the A winding in FIG. 8 are given by $$u_{SA}=\sqrt{3}u_S \sin \omega t, u_{SB}=0, u_{SC}=0 \quad (19)$$

From Equation (7), the dq space vector voltages are given by $$u_{SD} = \frac{2}{3}\sqrt{3}\, u_S \sin \omega t \quad (20)$$

$$u_{SQ} = 0$$

Hence, by integrating over period $\beta$, the flux becomes $$\psi_{SD} = \int_{\pi/3}^{\pi} u_{SD} dt = \sqrt{3}\frac{u_S}{\omega} \quad (21)$$

$$\psi_{SQ} = 0 \quad (22)$$

This is the correct flux and orientation to enable contactor poles D2 & D3 to be closed at the zero crossing of the CA line voltage to apply full voltage to all windings of the motor without any DC transient.

Consideration must be given to timing when implementing the invention. For Y-connected and delta-connected motors connected by 3-wire connection through contactor poles between the supply and the motor terminals, two phases are first connected when their line voltage at its peak, and the third phase is connected a quarter of a cycle later.

For delta-connected motors where the contactor poles are within the delta (FIG. 8), one pole (e.g. D1) is closed at $60°$ after zero voltage in the line voltage (AC) that will be connected across that winding; the other two poles are dosed $120°$ later at the following zero in the line voltage. Application of the invention to Y-delta starters will now be discussed. One of the principal problems in starting motors is handling the severe current peaks that occur. The prime purpose of the voltage reduction in Y-delta starting is to reduce starting current by a factor of three during the period of acceleration up to between 70% and 90% of full speed. Delta motors that would draw 6 to 10 times full load current (FLC) at full voltage then draw only 2 to 3.5 FLC when connected in Y configuration. However, torque is also reduced by the same factor of three whilst the motor is connected in Y.

A transition to full-voltage operation in delta must then be made to provide full torque capability. Unfortunately, the discontinuity of changing from reduced voltage to full voltage can result in severe currents transients over a few cycles that may reach 18 FLC for high-efficiency motors. This presents a major problem in setting current protection relays which, in order to be able to start a motor, may have to be set at too high a value to provide safe protection during running. Also, for larger motors, these extreme transients may trip breakers beyond the motor's own overload breaker, causing problems for other loads.

A number of factors influence the current transient peak value:

- The basic level for current after reconnection in delta is set by the 'steady state' value of current that would flow if the motor only accelerated slowly.
- The sudden application of full voltage inevitably produces a transient surge before current settles down to accelerate the motor to full speed.
- Disconnection from the Y contactor leaves the motor with rotor current flowing, which causes the motor to generate a back-e.m.f. that can greatly increase the current peaks.

It will be shown that utilizing POW switching for the delta reconnection has a major impact on the current and torque transients, and can reduce current peaks by up to 40%. The torque pulsation peaks are also greatly reduced.

Figure 10:
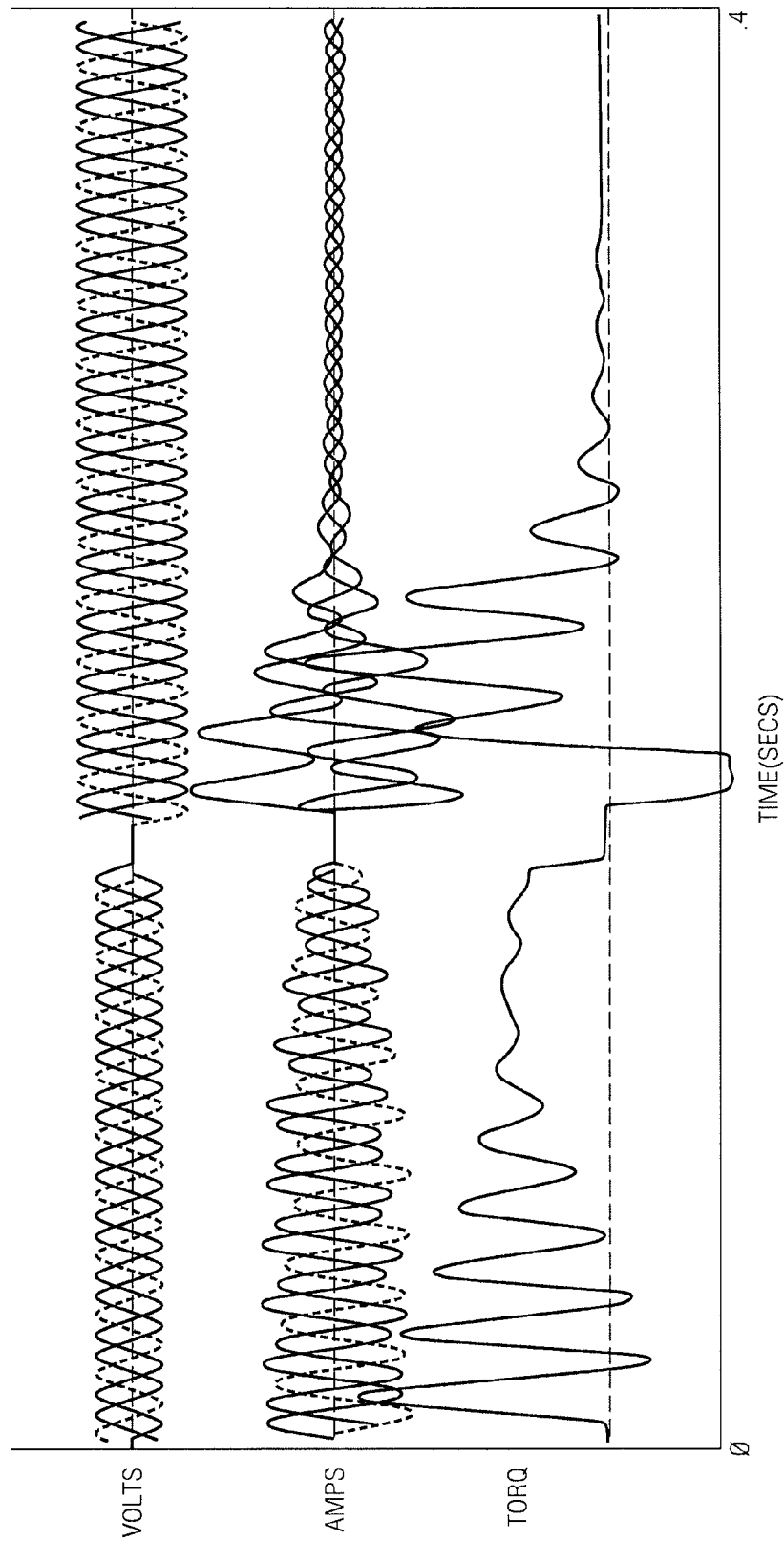
FIG. 10 shows current and voltage during a Y-delta start with simultaneous contactor closure.

Shown in FIG. 10, is a conventional Y-delta start with simultaneous contactor closure. The top traces show the reduced winding voltages when connected in Y. There is significant torque pulsation following the reclosure in delta, but less than for the conventional DOL full voltage start in delta, shown in FIG. 1. The top traces show the reduced winding voltages when connected in Y. Significant torque pulsation occurs, but less than for the DOL delta start shown in FIG. 1.

Figure 11:
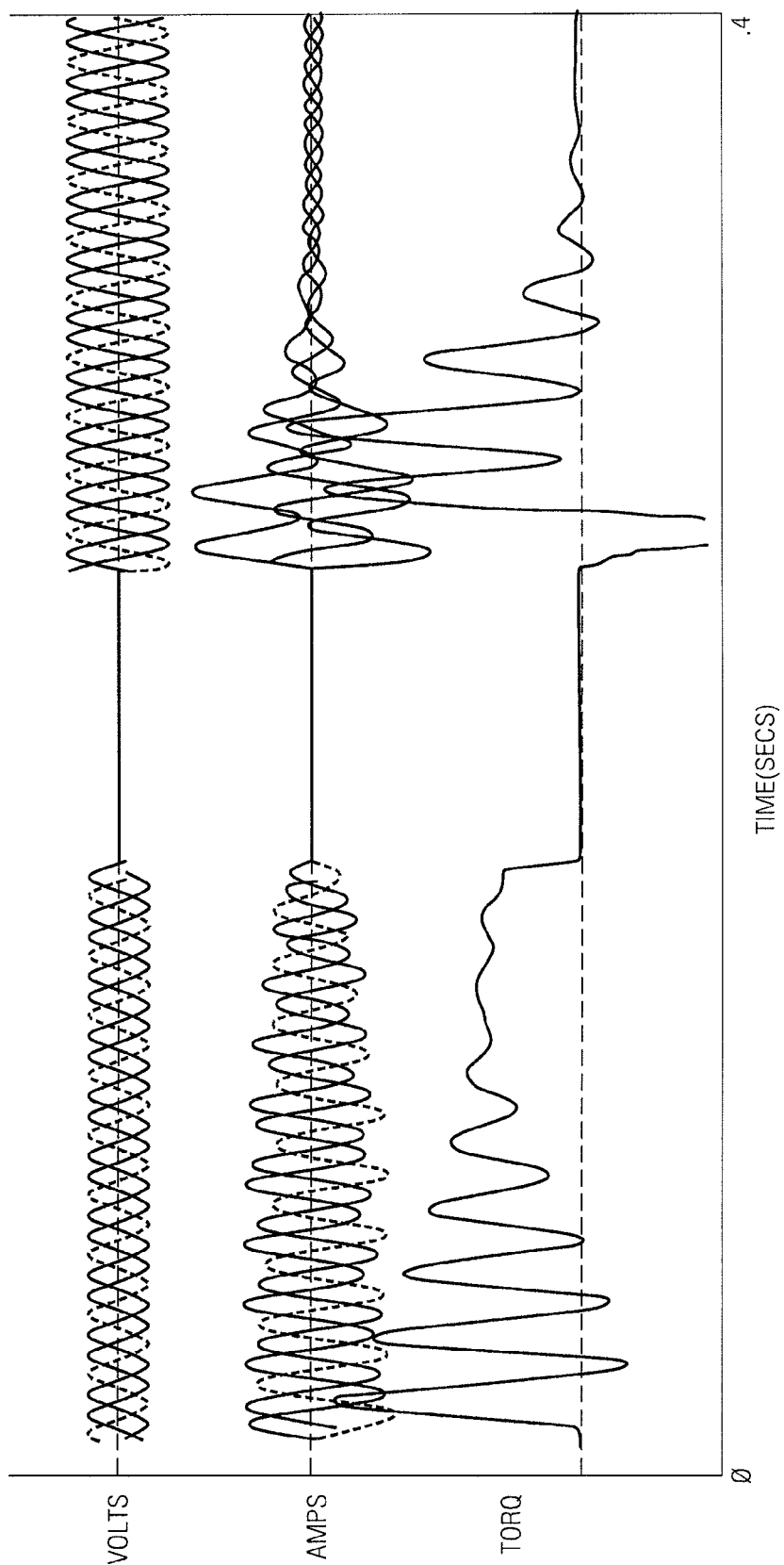
FIG. 11 shows the same Y-delta start as FIG. 10, except that 0.1 seconds is allowed for the rotor currents and associated back-e.m.f. induced in the stator windings to decay.

FIG. 11 shows the same Y-delta start as FIG. 10. except that 0.1 seconds is allowed for the rotor currents and associated back-e.m.f. induced in the stator windings to decay. Significant torque pulsation still occurs, but delta current peaks are lower than in FIG. 10. The simultaneous delta reconnection still shows torque pulsation and current unbalance, but less than when the back-e.m.f. is not allowed to decay.

Figure 12:
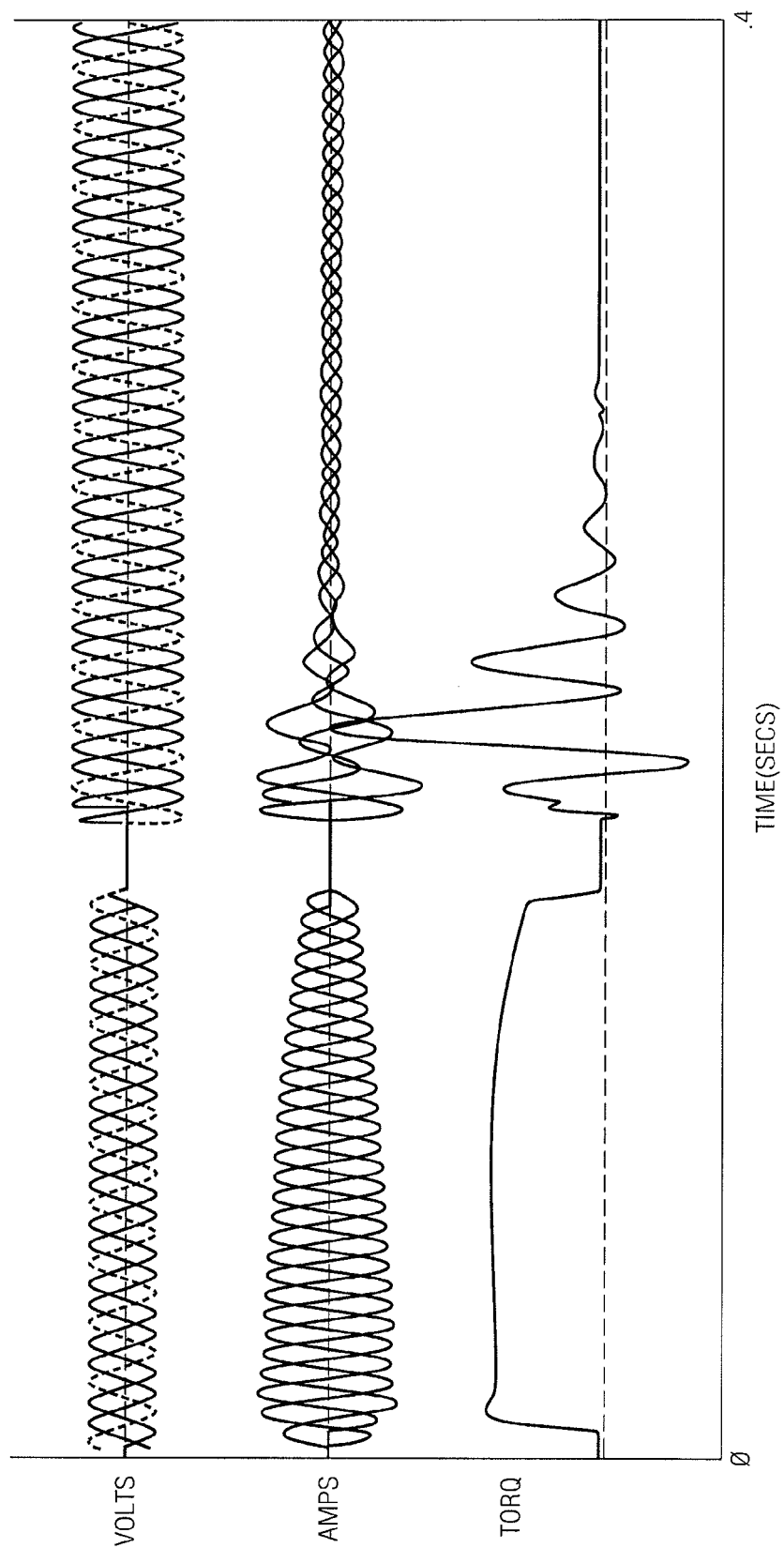
FIG. 12 and FIG. 13 show the same starts but with switching embodying the invention used for both the initial Y connection and the delta reconnection.
Figure 13:
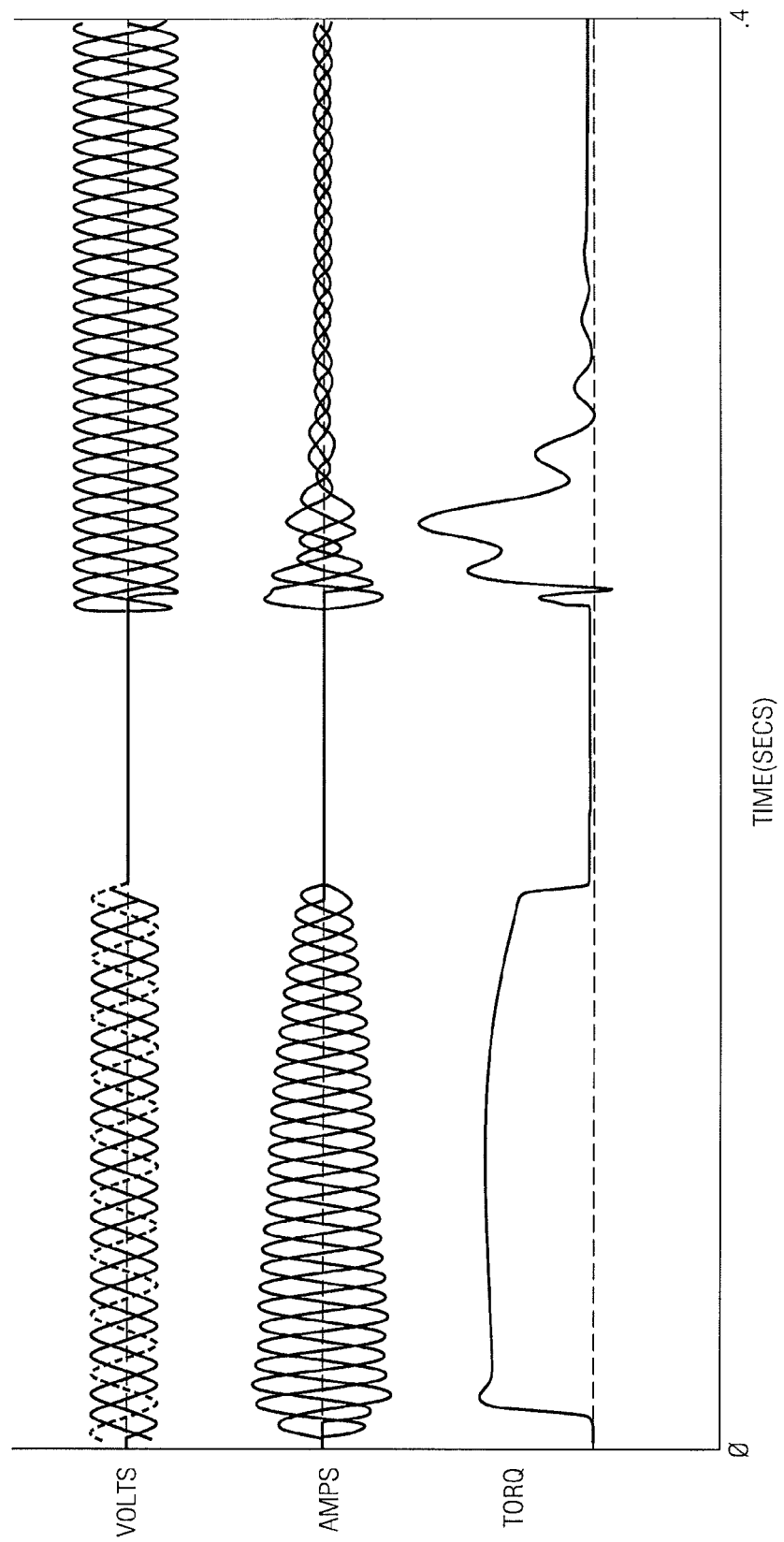

FIG. 12 and FIG. 13 show the same starts but with POW switching used for both the initial Y connection and the delta reconnection. The POW switching eliminates the torque pulsation for the Y connection, but there is still pulsation at the delta connection. In FIG. 13, the delay before delta reconnection has allowed the back-e.m.f. induced by the rotor currents to come into phase synchronization with the supply at the moment of reconnection, and it is seen that the torque pulsation is virtually eliminated, with no negative torque transient, and that the surge current peaks have also been eliminated. Significant pulsation and current peaks are seen on reconnection in delta, but much less than with simultaneous closure as in FIG. 1. FIG. 13 shows that torque pulsation is greatly reduced, and negative torque virtually eliminated compared with traditional starting shown in FIGS. 1 and 10.

Table I below compares the simultaneous and 2-stage POW procedures for the delta reconnection. Values are given in per-unit notation as multiples of full load current and rated torque. The 2-stage closure sequence reduces the transient peak current from 9.2 FLC to 5.8 FLC—a reduction of 37%. The table compares current and torque peaks at the delta reconnection for simultaneous and POW switching. Values are given in per-unit notation.

TABLE 1

Current & torque values for the delta reconnection in FIG. 10 & FIG. 11

|  | Simultaneous closure | POW closure |
| --- | --- | --- |
| Peak stator current | 9.2 pu | 5.8 pu |
| Negative torque | −1.7 pu | 0 |
| Peak torque | 3.7 pu | 3.1 pu |

Issues relating to POW switching with back-e.m.f. synchronization will now be discussed.

Figure 14:
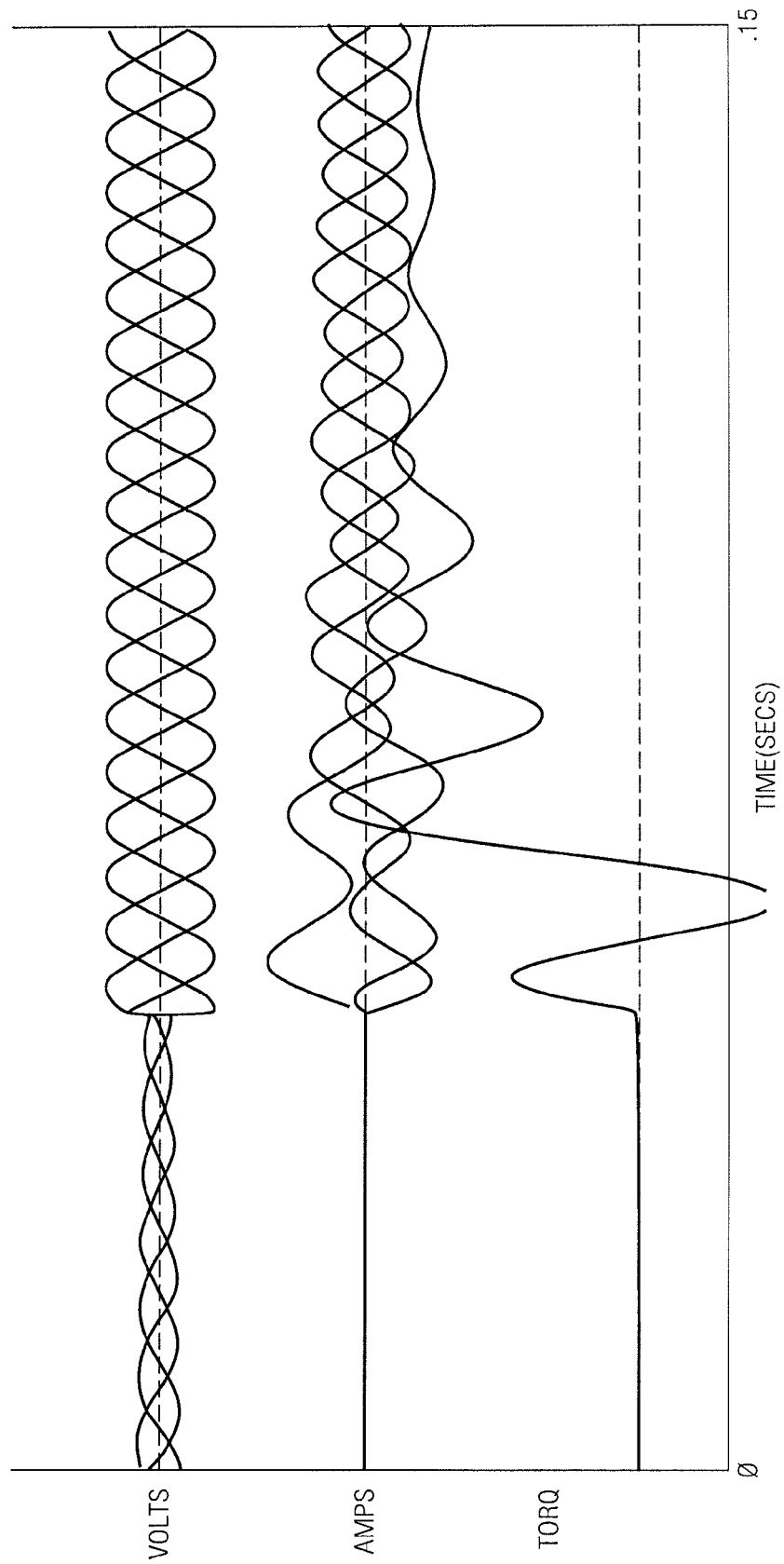
FIG. 14 shows current and voltage upon reconnection in delta at 80% of full speed with simultaneous contact closure.
Figure 15:
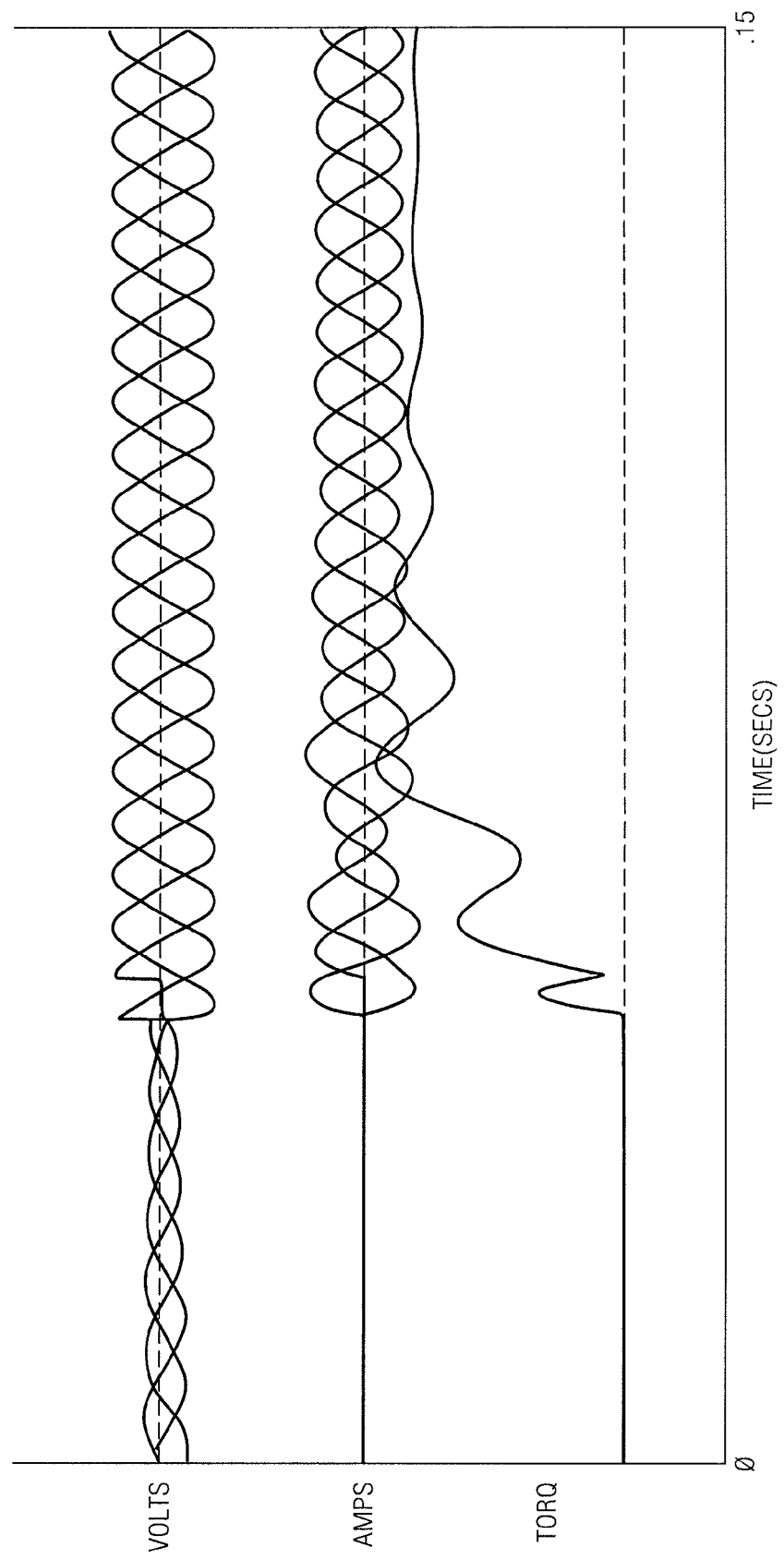
FIG. 15 shows current and voltage upon reconnection in delta at 80% of full speed with POW contact closure.

The voltage waveforms in FIG. 14 and FIG. 15 show the first two cycles of the decaying back-e.m.f. voltage visible at the motor terminals following the opening of the Y contactor, before reconnecting the motor in delta. At the moment when the delta contactor is closed to apply full voltage, the current that flows is determined by the sum of the supply voltage and the opposing back-e.m.f., added as AC quantities, taking into account their phase difference. If they are in phase, the opposing back-e.m.f. cancels part of the supply voltage, and the resulting current is modest. If the back-e.m.f. is 180° out of phase with the supply, giving a very large voltage difference, the resulting motor transient is very large—and is responsible for the severe transient currents frequently encountered in practice. In FIG. 14, load inertia is very high, so that current and torque remain high in delta. The decaying back-e.m.f. at the motor terminals can be seen before full delta voltage is applied. Initial stator current peaks are well in excess of the steady state value later on. A negative torque pulse occurs. In FIG. 15, the decaying back-e.m.f. at the motor terminals is the same as in FIG. 11 and FIG. 13. Initial stator current peaks are comparable with the steady state value later on, and the negative torque pulse is eliminated, and overall pulsation much reduced.

Two methods of handling back-e.m.f are possible to minimize stator current peaks and torque pulsation. The simpler method allows a short delay between opening the Y contactor and closing the delta contactor, to allow the rotor currents and back-e.m.f to decay (as was done by the 0.1 sec delay in FIG. 11 with simultaneous switching, and FIG. 13 for POW switching). This reduces the transient current due to an unfavourable back-e.m.f phase angle. For the motor in Table 2, values closer to the average values would result.

However, if the back-e.m.f. phase angle is measured, waiting to close the delta contactor until the back-e.m.f. and supply voltage are virtually in phase before switching actively reduces current and torque peaks. They come into phase with each other within a few cycles due to the lower frequency of the back-e.m.f. (80% of supply frequency if the motor is at 80% of full speed). Reconnection in delta is then done using POW switching. The back-e.m.f. then works to actively reduce surge currents and produce the minimum values in Table 2.

The benefit of waiting for synchronization between the supply and the back-e.m.f. before reclosing in delta can be seen in Table 2. The table shows measurements from a computer simulation of reconnection when the phase difference between the back-e.m.f. and supply took values between 0° and 360° degrees at 10° intervals. The table shows the worst, best, and average peak currents and torque pulsations. The table shows that not synchronizing the back-e.m.f. and supply at the moment of reconnection can cause variation in the peak stator current by more than a factor of two. The best case is when they are synchronized.

TABLE 2

Effect on current & torque in a Y-delta starter when reconnecting in delta

| Wye-delta transition at 80% speed | Simultaneous switching | | | POW switching | | |
| --- | --- | --- | --- | --- | --- | --- |
|  | Maximum | Minimum | Average | Maximum | Minimum | Average |
| Stator current (p.u.) | 16.9 | 6.8 | 12.5 | 12.8 | 5.0 | 9.5 |
| Negative torque (p.u.) | −11.0 | 0.0 | −5.4 | −6.7 | 0.0 | −2.4 |
| Peak torque | 3.8 | 3.5 | 3.7 | 3.7 | 2.6 | 3.5 |

A study of the current peaks associated with Y-delta switching for over 25 different motors showed that POW switching with back-e.m.f. synchronization, compared with simultaneous switching, reduces peak transient currents by between 23% and 41%, with an average reduction of 31%. An 18.0 times FLC transient would be reduced to between 13.8 and 10.6 FLC, which would present no problem in setting circuit breakers.

Aspects of POW controller circuit design will now be described.

Figures 16, 17:
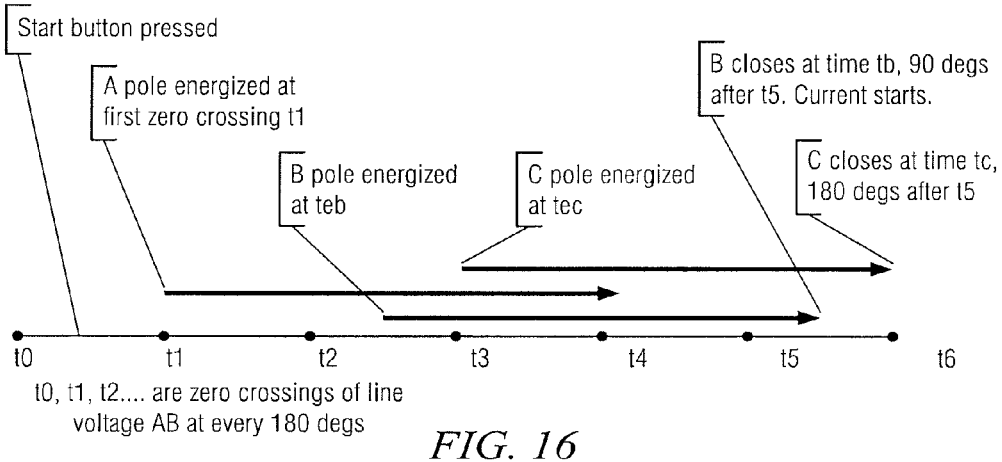
FIG. 16 is a timing diagram for closure of contactor poles S1, S2, and S3 for POW starting of Y-connected motor.
FIG. 17 is a block diagram that illustrates the structure of software used in implementing the invention.

With reference to FIG. 16, there is shown a timing diagram for closure of contactor poles S1, S2, and S3 for POW starting of Y-connected motor. The timing marks t0, t1, t2 etc., are successive zero crossings of the AB supply line voltage.

To start a Y-connected motor as shown in FIGS. 3 and 12 by POW switching, the three contactor poles S1, S2, and S3 must be closed in the correct sequence at precise points on the supply waveforms. Before the contactor poles are closed, the supply phases are first connected to the motor terminals. When the Start button is pressed, the A-phase pole S1 is closed. This time is not critical, as no motor current will flow until at least two poles are closed. For reproducibility, the contactor pole is energised at the first AB line voltage crossing (t1 in FIG. 16). For POW starting, the B-phase pole S2 must close at a peak of the AB line voltage mid-way between any two zero crossings e.g. mid-way between t5 and t6. The C-phase pole S3 must close exactly 90° later at t6. It takes typical contactor poles some tens of milliseconds to close following coil energisation. Hence broad arrows in FIG. 16 show the delay between initial energisation and actual pole closure (at the arrow head).

To control this process, the contact closure delays must be known, and the lines S2 and S3 must be energized at a time to allow for this delay so that they close at the correct instants. The whole process must be synchronized to the phase of the supply. This may be done by observing and timing the zero crossings of the AB line voltage which occur at 0°, 180°, 360°, 540° etc., as indicated by the timing marks t0, t1, t2, t3 etc., in FIG. 16.

This is conveniently controlled by means of a microcontroller in which a software phase-locked loop (PLL) is synchronized to the supply voltage crossings t0, t1, t2, etc., using an internal timer incrementing in about one-microsecond intervals. Timings for pole energisation can then be calculated using the timer to close contactor poles at the correct instants. The table FIG. 17 shows the routines in a possible software structure for the control.

The software structure will now be described with reference to FIG. 17. For motor starting, the software allows different versions of the starter to be configured with different functionality by enabling or disabling (or omitting) appropriate routines to enable either DOL POW starting only, or Y-delta starting.

Overall timing is controlled by a phase-locked loop (PLL) interrupt routine that locks to the zero crossings of the AB line voltage, which occur every mains cycle at times t0, t2, t4 etc., as in FIG. 16.

A mains loss test is incorporated in the PLL routine that can detect mains loss within 2 or 3 cycles, so that the contactor can be opened to prevent the huge impulse torque and surge currents that can accompany the supply returning when the motor back-e.m.f. is out of phase with the supply. This would be equivalent to worst-case reconnection with simultaneous switching.

Before the start button is pressed, it is assumed that the 3-phase supply and control power (24V DC) have been connected. The program begins with the Reset routine. Control is then passed to the Check For Start routine.

Figure 18:
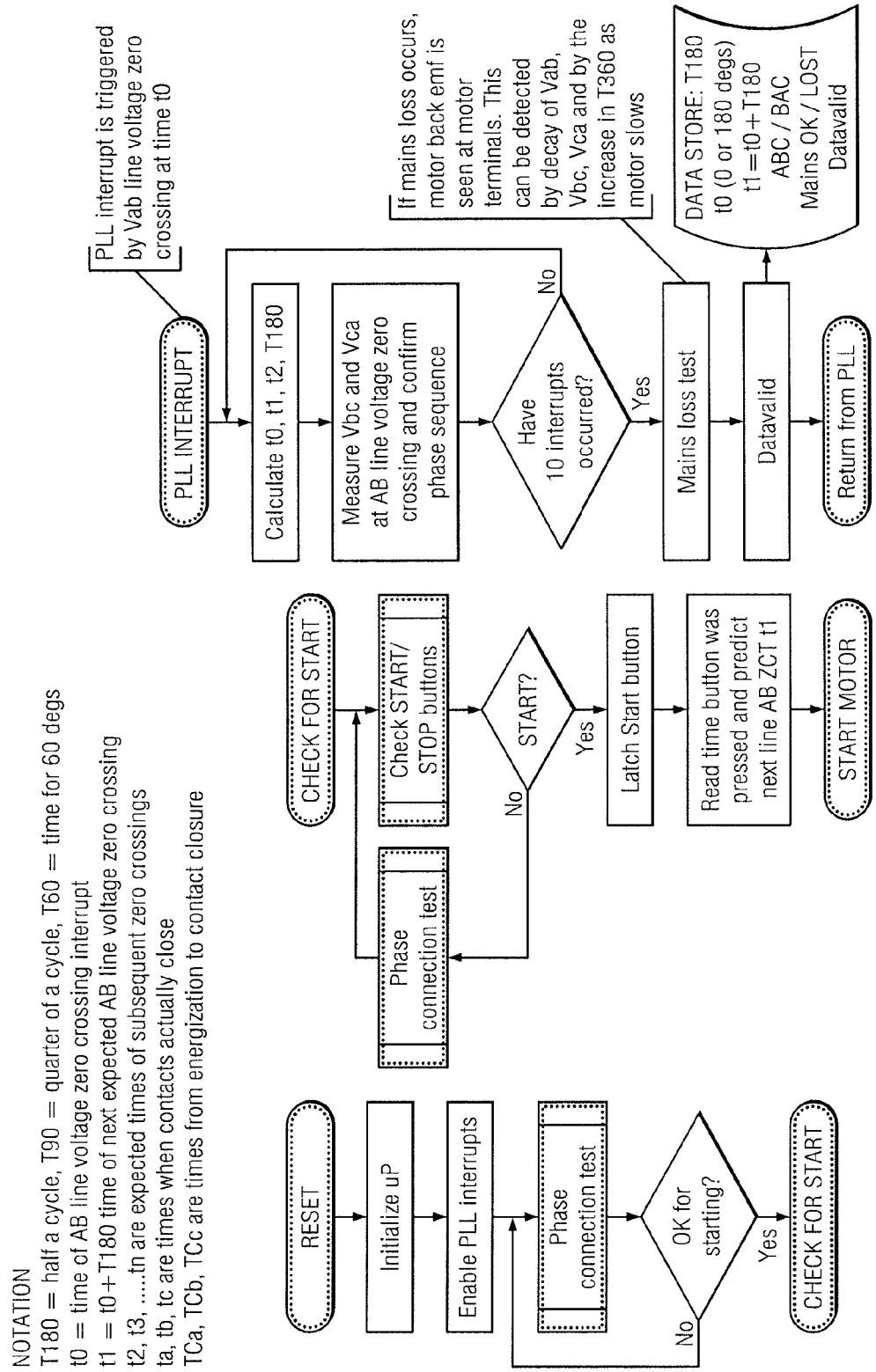
FIG. 18 is a flow diagram illustrating the operation of software routines in software control systems that implement an embodiment of the invention.

The program starts at Reset in FIG. 18. It initialises the microcontroller and enables the PLL interrupt routine. If the mains supply is connected, the Reset routine passes control to the Check for Start routine which reads the state of the Start button. When the Start button is pressed, control passes to Start Motor in Wye.

PLL Interrupt is an interrupt routine that runs whenever a supply zero crossing time (ZCT) occurs and synchronizes events to the phase of the supply. The supply half period T180 between zero crossings is calculated so that future zero crossings can be predicted e.g., t1=t0+T180. This enables pole closures to be correctly timed with respect to the phase of the supply.

Figure 19:
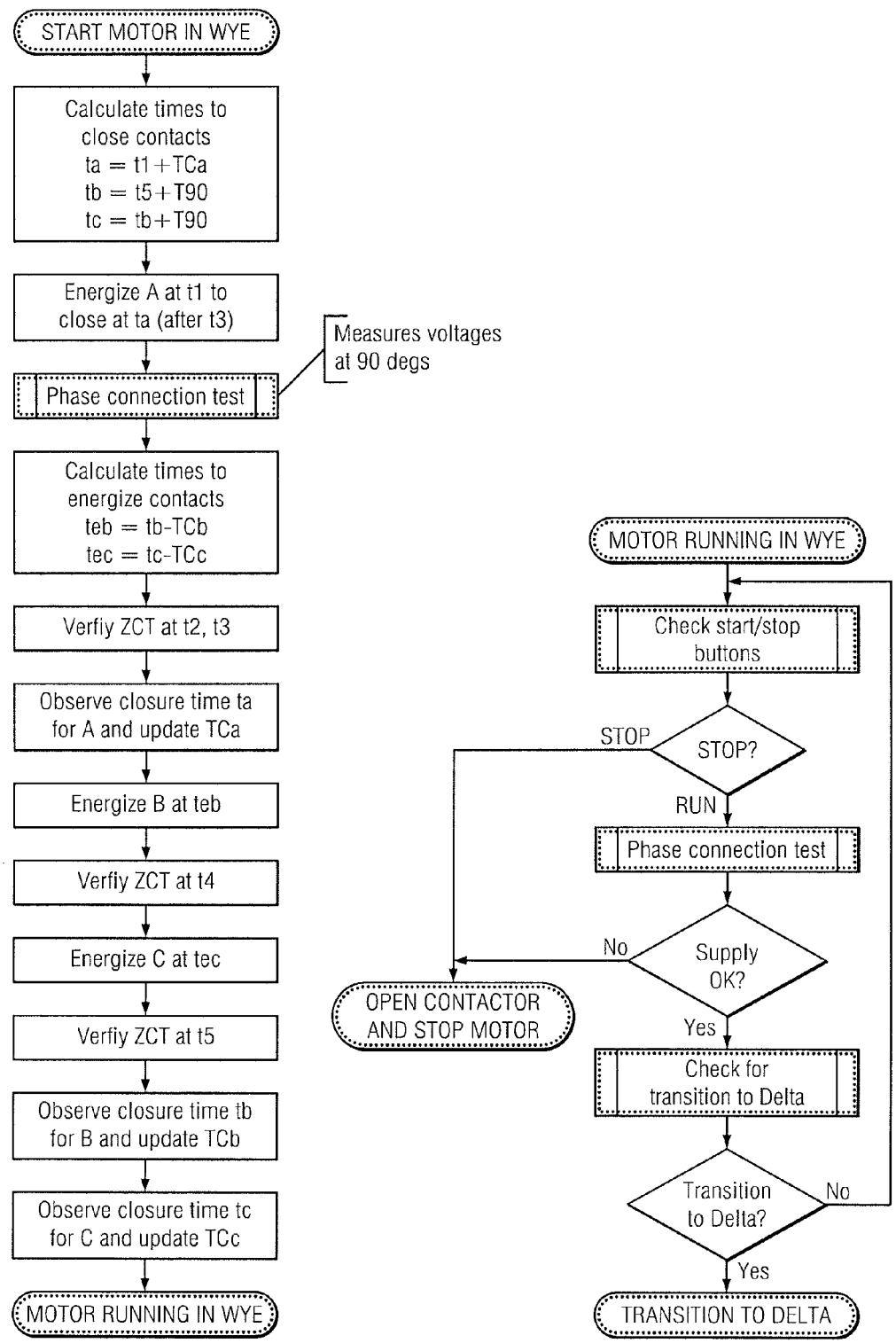
FIG. 19 is a flow diagram illustrating the routines Start Motor in Y and Motor Running in Y routines of FIG. 18.

The routine Start Motor in Wye, illustrated in FIG. 19, controls the POW starting of the motor according to FIG. 16. It is entered when the start button is pressed. The timing diagram in FIG. 16 shows the sequence followed for closing the contactor poles. At the time t1 for the next supply zero, the A pole is energized. Then the B pole is energized after the zero crossing at t2 so that it will close at the peak of the AB line voltage at time tb−t2+(3.180+90)°. Since it takes TCb to close the contact, energization must occur at time tb−TCb. Pole C is energized at tec=tc−TCc so as to close 90° later at time tc=tb+90°.

When all of the contactor poles have been closed so that the motor is fully connected in Y-configuration, control is passed to the Motor Running in Wye routine in FIG. 19.

In the routine Motor Running in Wye for the basic unit (DOL starting only), when all the motor contacts have closed, the motor accelerates up to speed and continues running. If the Check Start/Stop Buttons subroutine detects that the stop button has been pressed, the contactor is opened to stop the motor by the Open Contactor & Stop Motor routine. There is no difference between starting Y-connected or delta-connected motors, unless the contactor poles are placed within the delta, which effects detailed timing, as has already been discussed. The contactor is also opened if a supply failure is detected in either the Phase Connection Test subroutine or in the Mains Loss test in the PLL Interrupt routine.

For a Y-Delta starter, the motor is first connected in Y by POW switching, so that when all the Y contacts have closed, the motor accelerates in Y configuration. For this version, a Check for Transition to Delta subroutine is added to the Motor Running in Y routine in FIG. 19. This subroutine monitors motor current and starting time elapsed, to determine when to switch over to delta operation. As with the basic unit, the same checks are made for the Stop button being pressed and for Mains Loss.

Figure 20:
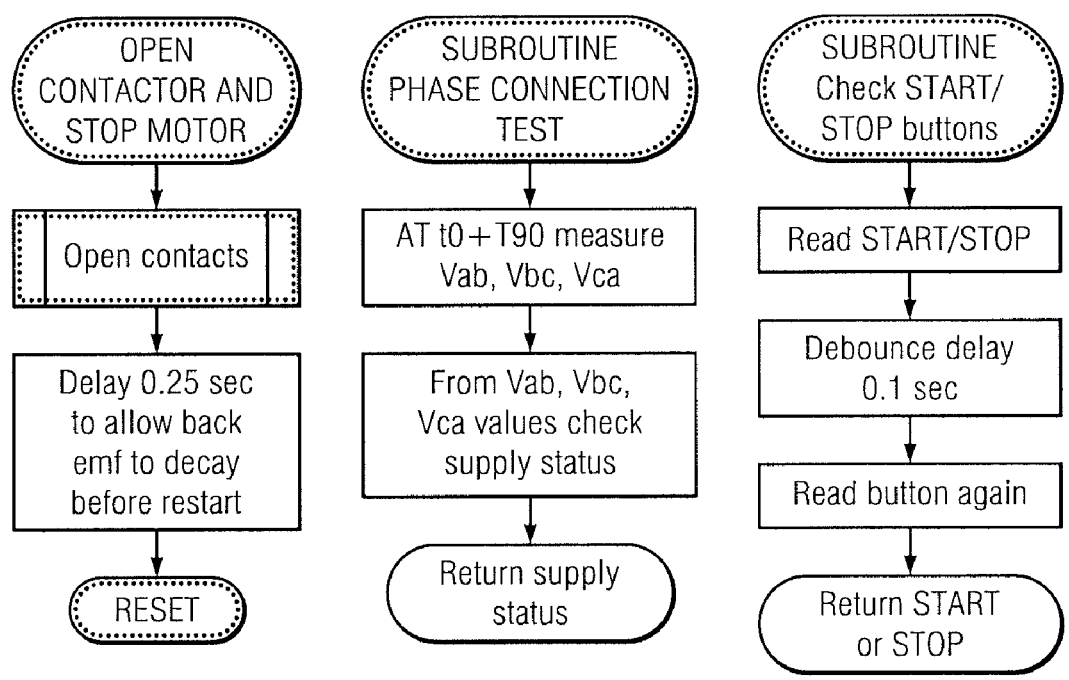
FIG. 20 is a flow diagram illustrating minor routines in the software.

The subroutine Phase Connection Test, illustrated in FIG. 20, measures the voltages to verify mains connection, and rotation sequence.

The routine Open Contactor & Stop Motor opens the contactor and waits approximately 0.25 sec (increasing with motor size) to allow motor back-e.m.f. to decay before returning to Reset to allow the motor to be restarted.

The interrupt routine Phase Locked Loop (PLL) is a critical routine that establishes overall timing with respect to the mains supply. The PLL interrupt routine is locked to positive-going zero crossings of the AB line voltage that occur every 360° at times t0, t2 etc. From these interrupts, the period of the mains T360 is known, and quarter-cycle and half-cycle periods T90 and T180 are deduced. Its flow chart is shown in FIG. 18, and its operation is now described.

Pseudo-code is shown below (in Listing 1) for the PLL time calculations made each time the interrupt routine is entered.

PLL time calculations: variables starting with 'T' are time intervals: those with 't' are time instants. Times are read from a free-running counter, assumed to be incrementing at 1 MHz in this example. On entering the PLL routine at the Vab zero crossing, the code of Listing 1 is executed, corresponding to the box labelled "Calculate t0, t1, t2, T180" in FIG. 18.

Mains loss test: if the supply is interrupted, the motor back-e.m.f. is seen at the motor terminals. As the motor slows down, this can be detected by an immediate large increase in the zero crossing time error ZCerror in the code above. For example, if the motor takes 20 seconds to slow down, the successive values of ZCerror (in microseconds) will be approximately 6000, 12000, 18000, 24000 over the first 4 cycles of power loss, compared with less than 100 even with 5% noise on the line supply. The contactor may be opened to avoid the huge impulse torque and inrush current that would accompany the supply returning when the back-e.m.f. is out of phase with the supply. ZCerror is measuring the phase difference in microseconds, and can directly show if the back-e.m.f. will be out of phase with the supply when it returns.

Determine phase sequence: the phase rotation sequence is determined by measuring line voltages Vbc & Vca at the Vab zero crossing. They should be equal to 0.86 times the peak line voltage, but have the opposite sign. The rotation sequence is determined by which one is positive as will be explained below.

The values of the other two line voltages are also measured at the time of the Vab voltage crossing. Vpk is the value of the peak line voltage.

If Vbc=+Vpk/2 and Vca=−Vpk/2 the supply rotation sequence is normal ABC.

If Vbc=−Vpk/2 and Vca=+Vpk/2 the sequence is in reverse ACB.

If the sequence is reversed, the motor can be prevented from starting for safety reasons.

Figure 21:
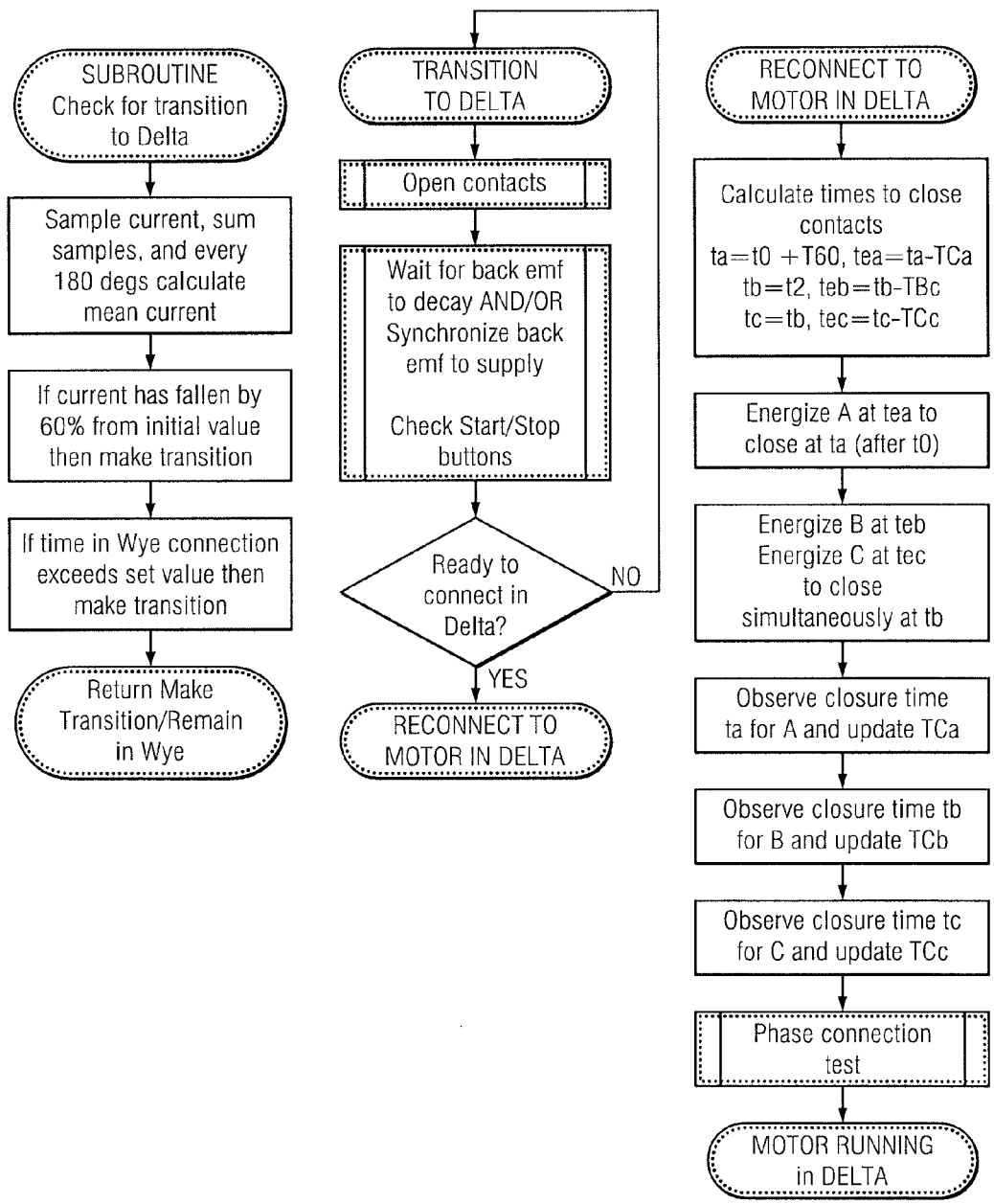
FIG. 21 is a flow diagram illustrating the subroutine Start Motor in Y and Motor Running in Y routines.

Additional software for Y-delta starting: to implement Y-delta starting, a POW transition must be made from Y to delta during acceleration. The time to make the transition to delta configuration may be determined by a timer, or better still, by when current falls by approximately 50%. A check for this is made in the subroutine Check for Transition to Delta (FIG. 21) within the Motor Running in Wye routine, and control is then passed to the Transition to Delta routine. When the phases of the supply and motor back-e.m.f. are in phase, the motor is reconnected into delta by POW switching.

In the routine Transition to Delta, the first step is to open the contactor poles to disconnect from Y configuration, in order to be able to reconfigure the motor in delta.

To minimize inrush surge currents and torque pulsations on reconnection, this subroutine calls a synchronization algorithm Synchronize Back Emf To Supply that observes the zero crossings of the decaying back-e.m.f. generated across one motor phase winding, and either waits for the phases of the back-e.m.f. and supply to become synchronized, or for this back-e.m.f. to decay to a low value, before reconnecting the supply using POW switching. The synchronization subroutine and the reconnection procedure are described below, and differ in detail from starting the motor in Y because the contactor poles will be within the delta.

Figure 22:
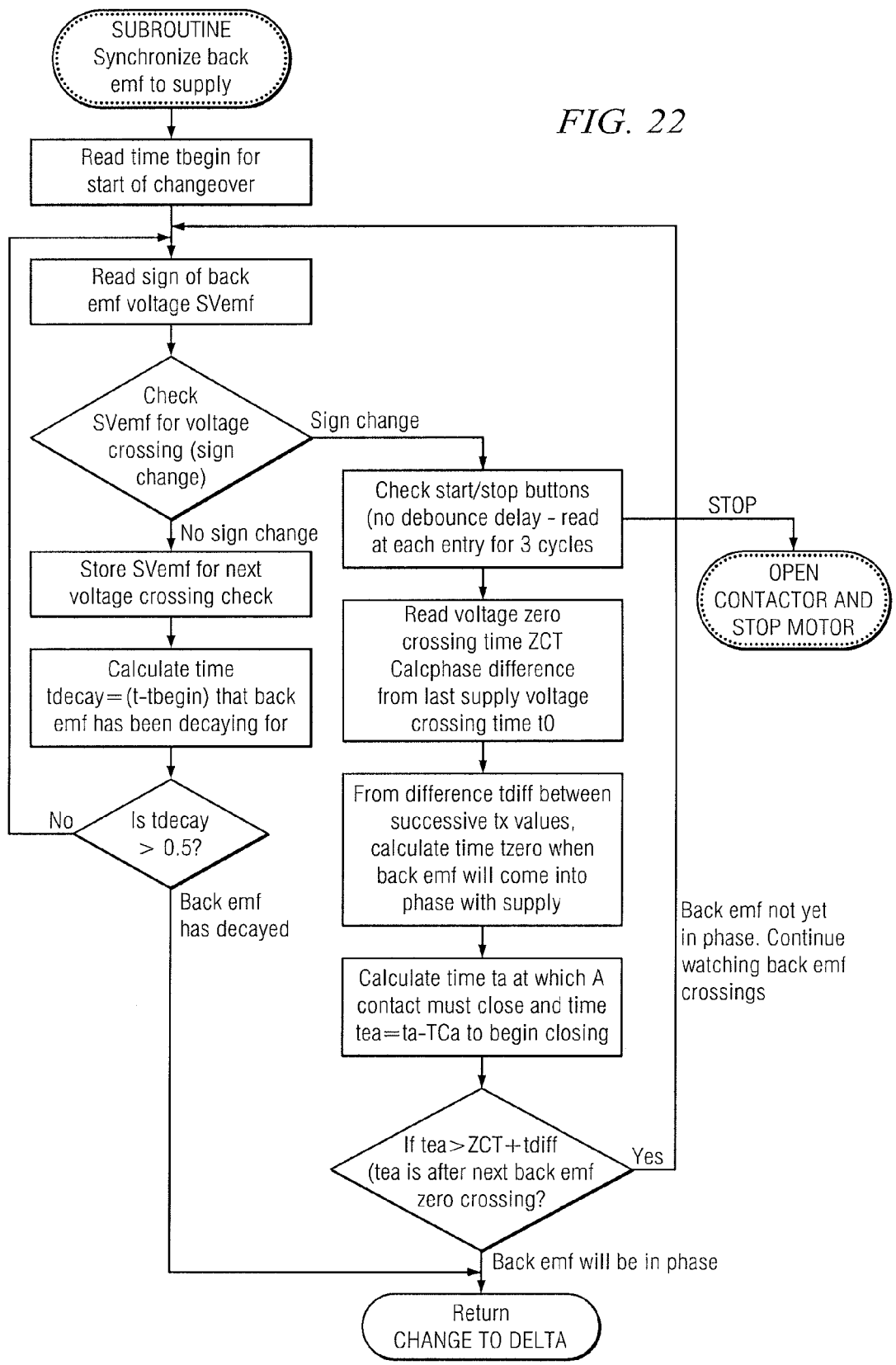
FIG. 22 is a flow diagram illustrating the subroutine Synchronize back-c.m.f. to supply.

The subroutine Synchronize Back Emf To Supply will now be described further. The back-e.m.f. synchronization routine in FIG. 22 observes the zero crossings of the back-e.m.f. voltage across stator phase winding A, by means of the change in sign of the back-e.m.f. voltage. At each zero crossing the time interval is noted from the last supply Vab line zero voltage crossing to calculate the phase shift between the supply and the back-e.m.f.

The trend of changing phase shifts is observed in order to predict when the supply and back-e.m.f, will become inphase, and therefore the correct time calculated to energize contact poles so that the POW closure of the contact poles will coincide with phase synchronization. Pseudo-code for the routine Synchronizing the Back E.m.f. to the Supply is shown in Listing 2 below.

If the back-e.m.f. has almost completely decayed before synchronization is reached, the motor is reconnected in delta by POW switching without waiting for synchronization, since with virtually zero back-e.m.f. there is no disadvantage from non-synchronization.

Figure 23:
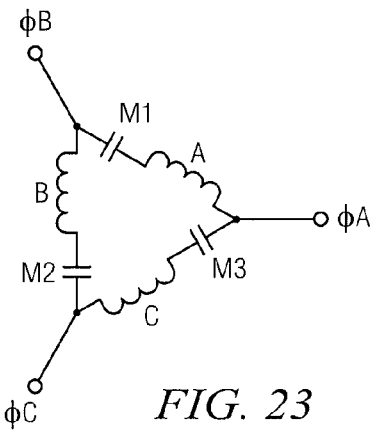
FIG. 23 shows a contactor configuration in an embodiment of the invention for connecting a motor in delta.
Figure 24:
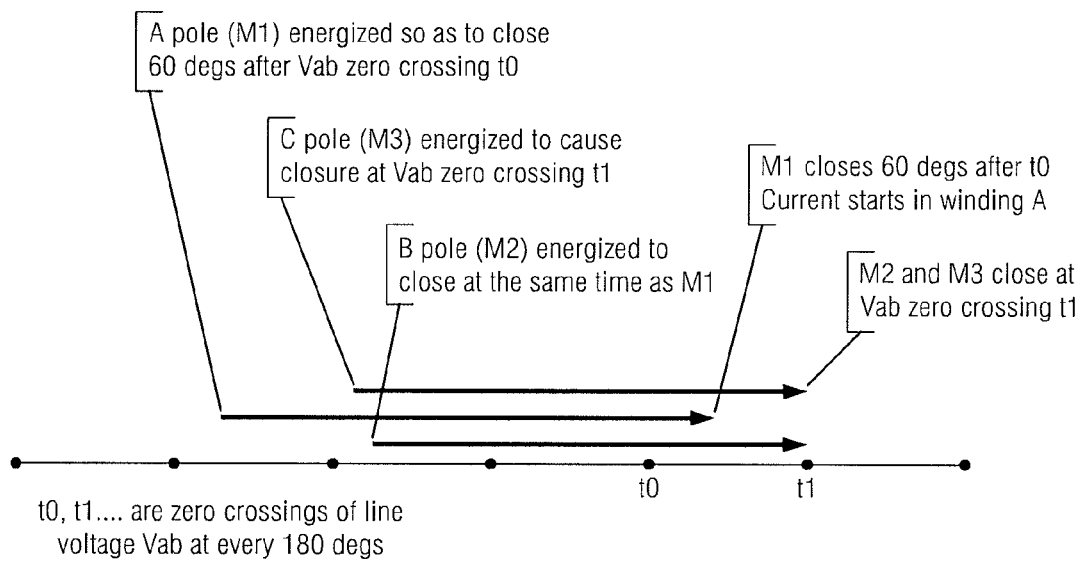
FIG. 24 is a timing diagram for connecting a motor in delta by a method embodying the invention.

As soon as the back-e.m.f. is synchronized, or has almost completely decayed, control then passes from routine Transition to Delta to routine Reconnect Motor in Delta, which effects reconnection in delta by POW switching according to the timing diagram shown in FIG. 24 and the contactor configuration FIG. 23.

To connect the motor in delta, as shown in FIG. 23, the contacts M1, M2, M3 to operate the motor in delta are all open initially, and are closed in two stages by POW switching, as follows:

Stage 1 M1 is closed 60° degrees after a Vab line voltage zero crossing, and current starts to flow in winding A. No current flows in windings B & C.

Stage 2 M2 & M3 are closed simultaneously exactly at the next Vab zero crossing 120° later. The motor is now fully connected and running in delta.

The timing of the contact closures is shown in FIG. 24.

Figure 25:
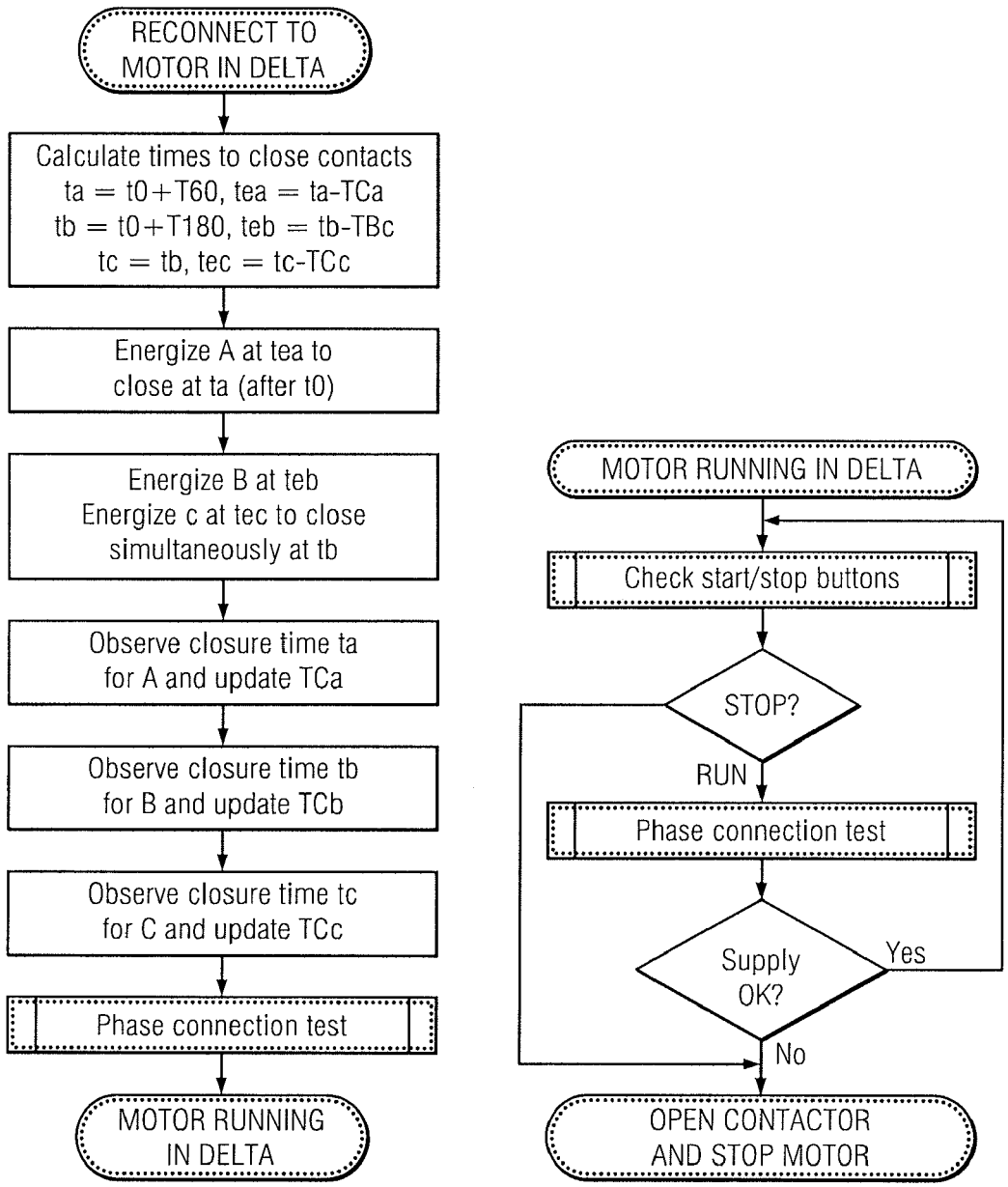
FIG. 25 is a flow diagram of routines to reconnect a motor in delta and for continuous motor running in delta in an embodiment of the invention.

Control is then passed to routine Running in Delta shown in FIG. 25, where the Stop button is continuously monitored for stopping the motor. The PLL Interrupt routine also remains operational and checks for unexpected supply outages by means of the Mains Loss routine, where optionally the motor can be rapidly disconnected to avoid the huge current surges and torque pulses if the supply recovers in a fraction of a second when the back-e.m.f. is still large but out of phase with the supply.

In addition to the above primary applications, the principles of the invention can readily be extended. The advantages of phase synchronisation have already been discussed with reference to FIGS. 14 and 15. Phase synchronization can also benefit various other applications as will now be described.

When a variable-frequency generator with crude speed control, such as a wind generator, is connected to a fixed-frequency supply, significant transient torque peaks and pulsations, and associated surge currents occur upon connection. These cause both unwanted mechanical and electrical stresses. Both can be greatly ameliorated if connection is made (i) when the generator frequency is close to the line frequency and (ii) by effecting the 3-phase connection using POW 2-stage switching at the moment when the phase of the supply voltage is closely synchronized with the phase of the generator voltage.

In many situations, standby generators are used to provide power following disruption of the utility supply. The standby generator may be kept running, or may be started following the power failure. A transfer switch is then used to disconnect the load from the utility supply, and then to connect it to the standby generator. In some cases, the need is to restore power as quickly as possible. If the load includes large motors, they may still be turning and generating a back-e.m.f. In such cases, connecting the standby generator to the load by simultaneously closing the three-phase contacts can result in high peak current surges, and the rating of the contacts and the generator must take this into account. The current surges can be reduced very significantly if the transfer switch operates using two-stage POW switching. The two-stage contact closure is timed with respect to the standby generator 3-phase voltage waveform. If, before switching, the load has a significant back-e.m.f., then the moment to connect the generator by POW switching should be when the phase of the back-e.m.f. in the motor load is synchronized with the phase of the generator voltage. This realises the full benefits of synchronized POW switching, as with starting motors and Y-delta starting.

When the utility supply has been restored, the transfer switch is used to first disconnect the load from the standby generator, and then to reconnect to the utility supply using POW switching. The POW switching will be timed with respect to phase of the utility supply voltage waveform. If the load has a generated back-e.m.f. component, the optimum moment to connect the generator by POW switching is again when the phase of the back-e.m.f. in the load is synchronized with the phase of the utility supply voltage. This realises the full benefits of synchronized POW switching, as with starting motors and Y-D starting.

There are circumstances in which a controlled speed generator must be connected to a constant (line) frequency supply to provide additional generation capacity. In this case, the generator is usually provided with excitation control, and speed control by means of fuel control to a diesel, turbine, or other engine driving the generator. The generator is controlled to match its frequency to that of the supply at the moment of connection. Phase synchronization between the supply and generator voltage waveforms is important to give smooth connection. Minimum peak current surges and torque pulsation can be achieved if POW two-stage switching is used with phase synchronization.

Figure 26:
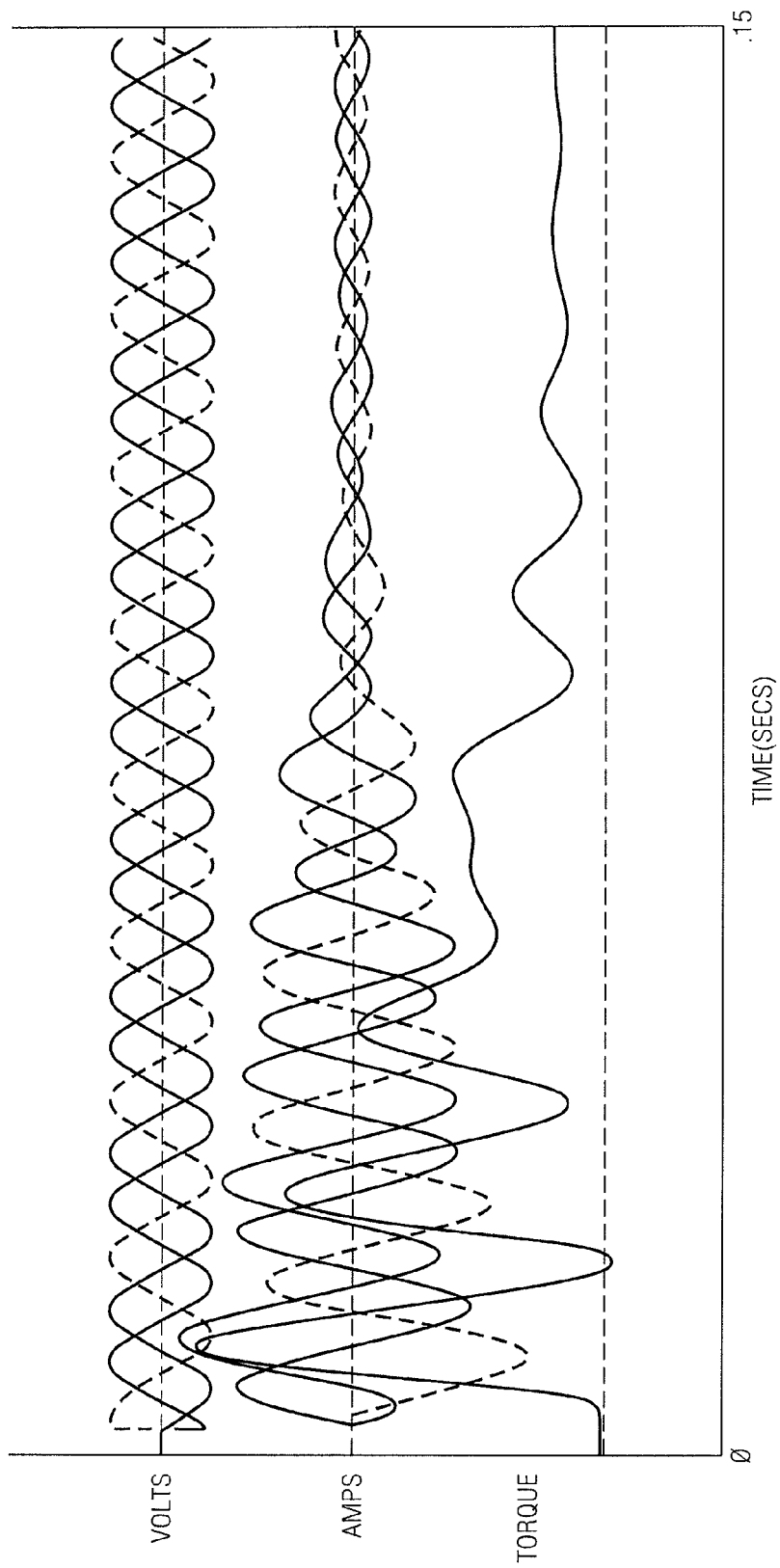
FIG. 26 is a graph of current, voltage and torque occurring during DOL motor reversal from full speed by phase reversal when all three phase contacts are closed simultaneously.
Figure 27:
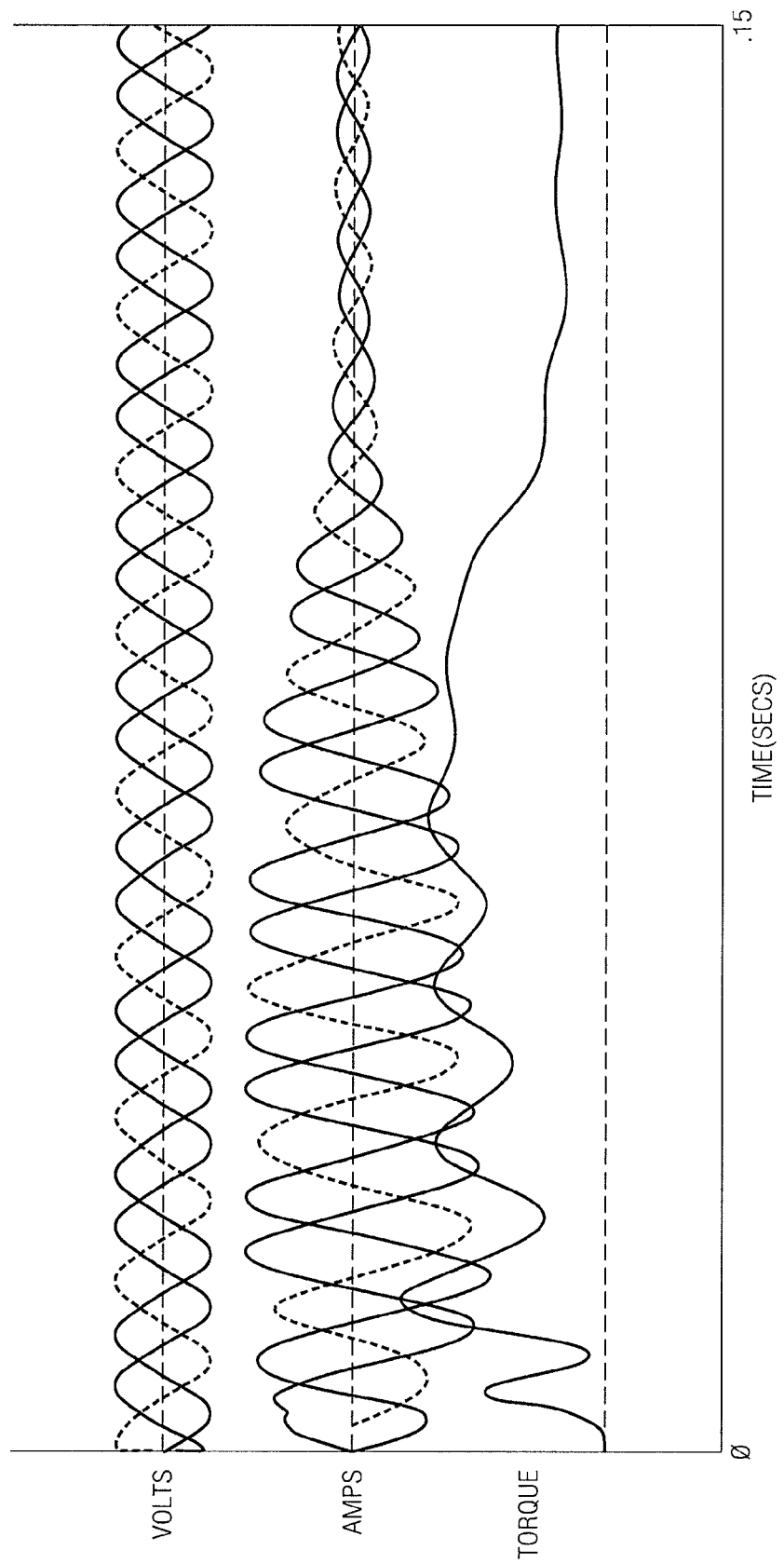
FIG. 27 is a graph of current, voltage and torque occurring during DOL motor reversal using two-step POW contact closure with phase synchronization.

Another important application of POW technology controlling motors is motor reversal by plugging. In such a reversal operation, the motor is first disconnected from the supply, and then re-connected with two of the supply connections to the motor interchanged. The supply then brakes the motor and drives it in the reverse direction. Since the motor is not stationary on re-connection, but is turning in the opposite direction from that of the supply, it causes strong transient current surges and torque pulsations. This is illustrated from the moment of re-connection in FIG. 26, where the aim is to reverse the motor from full speed. Very strong torque pulsations and peaks currents are seen. In FIG. 27, the reversal is done with POW two-stage technology, and the moment of re-connection is chosen to be when the instantaneous phase of the motor back-e.m.f. is close to the phase of the supply voltage. The torque pulsations are significantly reduced, and minimises mechanical stress on the motor drive train. In FIG. 27, a first pair of contacts is closed at 60° phase angle on reference phase; the third contact is closed 90° later). Torque pulsations and peaks are approximately halved as compared with the conventional arrangement shown in FIG. 26.

It will be appreciated that the invention is not restricted to three phase power supplies, and applies to wind generators and standby generators. The POW switching with back emf phase synchronisation is not restricted to three phase environments.

Also, the invention is not restricted to motors. It applies to generators (e.g. wind, or water-powered, or fossil fuel-powered generators) and to transformers. Reference to connecting power supply poles to windings can be construed, when considering generators, as connecting power-supply windings (instead of motor windings) to poles of a power-take off system (but this will still have multi-phase electrical cycles in it if the generator is to contribute to an electrical power supply grid, or add electricity to an existing multi-phase supply). It is still connecting poles to windings at the correct point in time/the correct point in phase relationships, but to generate power better rather than to drive a motor better. Similar comments apply to transformers.

Listing 1

| | |
|---|---|
| ZCT = t | % Read Zero Crossing Time from 1 MHz free running counter |
| ZCerror = ZCT − t360 | % Zero crossing time error calculated from previously predicted crossing time |
| T360 = T360 + ZCerror/32 | % Follow changes in mains period T360 (with smoothing) |
| IF T360 < 12000 THEN T360 = 12000 | % Set minimum value in µs for the mains period |
| t0 = t360 + ZCerror/32 | % Zero Crossing Time returned with fluctuations smoothed |
| T180 = T360/2 | % 180 deg interval |
| T90 = T180/2 | % 90 deg interval |
| t300 = (ZCT + T360 * 5/6) | % Earliest time 300 deg after zero crossing to start looking for next zero crossing |
| t360 = t0 + T360 | % Predicted time for next zero crossing time |
| t90 = t0 + T90 | % Time 90 degrees after zero crossing |
| t1 = t0 + T180 | % 180 deg negative going zero crossing time |
| t2 = t0 + T360 | % 360 deg zero crossing time |

Listing 2

| | |
|---|---|
| REM Detect back emf zero crossing time ZCT by change in sign of Vbemf | |
| IF Vbemf * Vbemf1 <= 0 THEN | 'Detect zero crossing by sign change in the back emf |
| ZCT = t | 'Store the back emf Zero Crossing Time |
| Sph = (ZCT − t0) * DEG | 'Phase of supply at ZCT & convert to degrees |
| Lag = Sph | 'Calc phase lag behind supply |
| IF Vbemf < 0 THEN Lag = Sph − 180 | |
| IF Lag < 0 THEN Lag = Lag + 360 | 'Ensure 0 to .360 deg range |
| ZCTdiff = ZCT − ZCT2 | 'Interval between ZCTs over one cycle |
| Lagdiff = Lag − Lag2 | 'Difference between lags over one cycle |
| | IF Lagdiff <= 0 THEN Lagdiff = Lagdiff + 360 |
| REM Calculate rotor speed from Lagdiff | |
| Speed = 360 / (Lagdiff + 360) | |
| REM Calculate number of back emf zero crossings for back emf to become in phase with supply | |
| NZeros = (360 − Lag) / Lagdiff | |
| REM Calculate time when back emf will come into phase with supply | |
| tZero = t + NZeros * ZCTdiff | |
| REM Find time tfire to energize pole A to give closure time tA nearest to tZero | |
| IF Sph > 180 THEN tO = tO + T180 | 'tO is time of last supply zero crossing |
| tA1 = tO + T60 + Nmin * T180 | 'Earliest possible closure time |
| teA1 = tA1 − TCa | 'Earliest energization time |
| REM When pole A is not energized find closure time tA closest to tZero | |
| IF t < tfire OR t > tA THEN | |
| DO WHILE tA1 < tZero + T60 | |
| tfire = teA1: tA = tA1 | 'Energization (firing) & closure times |
| tA1 = tA1 + T180 | 'Make trial increment for later closure |
| teA1 = teA1 + T180 | 'and energization times |
| LOOP | |
| END IF | |
| ZCT2 = ZCT1: ZCT1 = ZCT | 'Save present & previous values |
| Lag2 = Lag1: Lag1 = Lag | |
| END IF | |
| Vbemf1 = Vbemf | 'Store value |
| REM Test if pole energization will occur before next sample at t + dt | |
| IF t < tfire AND tfire < t + dt AND tfire <> 0 THEN | |
| ChangeToDelta = 'true' | 'Pole energization will occur at teA=tfire, to close at tA |
| END IF | |

What is claimed is:

1. A method of preventing current, or torque, transients in a multiphase electrical machine following loss of an a.c. supply voltage comprising the steps of:
   disconnecting windings of the machine from the supply;
   monitoring a back-e.m.f. at a terminal of the machine;
   determining a phase difference between the back-e.m.f. and a model phase of the a.c. supply voltage;
   connecting at least one winding between a source of the a.c. supply voltage and the electrical machine to allow current to flow through the at least one winding when the recovered supply and the back-e.m.f. are substantially in phase; and
   closing the remaining contactor poles after a controlled delay.

2. A method according to claim 1 in which the electrical machine is a three-phase motor.

\* \* \* \* \*